United States Patent
Tolpadi et al.

(10) Patent No.: US 9,548,640 B2
(45) Date of Patent: Jan. 17, 2017

(54) ROTOR WITH COOLING MANIFOLDS

(71) Applicant: General Electric Company, Schenectady, NY (US)

(72) Inventors: Anil Kumar Tolpadi, Niskayuna, NY (US); Christopher Anthony Kaminski, Niskayuna, NY (US); Gustavo Adolfo Ledezma, Bethlehem, NY (US); Rebinth Jose Robin, Bangalore (IN)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 14/097,997

(22) Filed: Dec. 5, 2013

(65) Prior Publication Data

US 2015/0162804 A1 Jun. 11, 2015

(51) Int. Cl.
  *H02K 1/32* (2006.01)
  *H02K 3/24* (2006.01)
  *H02K 3/34* (2006.01)
  *H02K 9/00* (2006.01)

(52) U.S. Cl.
  CPC ............. *H02K 9/005* (2013.01); *H02K 1/32* (2013.01); *H02K 3/24* (2013.01); *H02K 3/34* (2013.01)

(58) Field of Classification Search
  CPC ............ H02K 1/26; H02K 1/265; H02K 1/32; H02K 1/325; H02K 3/24; H02K 9/00; H02K 9/005; H02K 9/02
  USPC ....... 310/52, 55, 57, 58, 59, 60 R, 60 A, 61, 310/179, 210, 216.001, 201, 214, 215
  See application file for complete search history.

(56) References Cited

U.S. PATENT DOCUMENTS

| | | | | |
|---|---|---|---|---|
| 2,702,870 A | * | 2/1955 | Norris | H02K 3/24 310/262 |
| 2,986,664 A | * | 5/1961 | Willyoung | H02K 3/24 310/61 |
| 3,119,033 A | * | 1/1964 | Horsley | H02K 3/24 310/214 |
| 3,395,299 A | | 7/1968 | Quay et al. | |
| 3,660,702 A | | 5/1972 | Kishino | |
| 4,152,610 A | * | 5/1979 | Wallenstein | H02K 3/24 310/214 |
| 4,298,812 A | | 11/1981 | Damiron et al. | |
| 4,365,177 A | | 12/1982 | Madsen | |
| 4,634,910 A | | 1/1987 | Schollhorn | |

(Continued)

FOREIGN PATENT DOCUMENTS

EP   0166990 B2   3/1993

*Primary Examiner* — Quyen Leung
*Assistant Examiner* — Minki Chang
(74) *Attorney, Agent, or Firm* — Ernest G. Cusick; Hoffman Warnick LLC

(57) ABSTRACT

A rotor is disclosed, which includes a plurality of axially extending slots disposed about the rotor; a plurality of conductors radially stacked within each of the axial slots; and an axially extending subslot at a radially inward end of each of the slots. In each slot, a cooling path is provided, extending radially outward from the subslot. The cooling path includes at least one manifold, each manifold including at least one ingress passage, at least one egress passage axially distanced from the ingress passage, and a plurality of axially extending passages in fluid connection at a first end with one of the at least one ingress passages, and at a second end with one of the at least one egress passages. Each of the plurality of axially extending passages is disposed at a different radial depth in the slot from each other axially extending passage.

20 Claims, 21 Drawing Sheets

(56) References Cited

U.S. PATENT DOCUMENTS

| | | | |
|---|---|---|---|
| 5,477,095 A * | 12/1995 | Kleinburger | H02K 3/48 |
| | | | 310/214 |
| 5,483,112 A | 1/1996 | Biseli et al. | |
| 5,886,434 A | 3/1999 | Nygard | |
| 6,204,580 B1 | 3/2001 | Kazmierczak | |
| 6,459,180 B1 * | 10/2002 | Mori | H02K 15/0414 |
| | | | 174/15.6 |
| 6,965,185 B1 | 11/2005 | Kaminski et al. | |
| 7,190,094 B2 | 3/2007 | Mayor | |
| 8,040,002 B2 * | 10/2011 | Tartaglione | H02K 1/32 |
| | | | 310/201 |
| 8,049,379 B2 * | 11/2011 | Buskirk | H02K 3/24 |
| | | | 310/52 |
| 2003/0173861 A1 * | 9/2003 | Kawaguchi | H02K 1/246 |
| | | | 310/61 |
| 2007/0052313 A1 * | 3/2007 | Takahashi | H02K 1/32 |
| | | | 310/156.53 |
| 2010/0019591 A1 * | 1/2010 | Jarczynski | H02K 1/32 |
| | | | 310/61 |
| 2010/0096937 A1 * | 4/2010 | Kaminski | H02K 3/24 |
| | | | 310/61 |

* cited by examiner

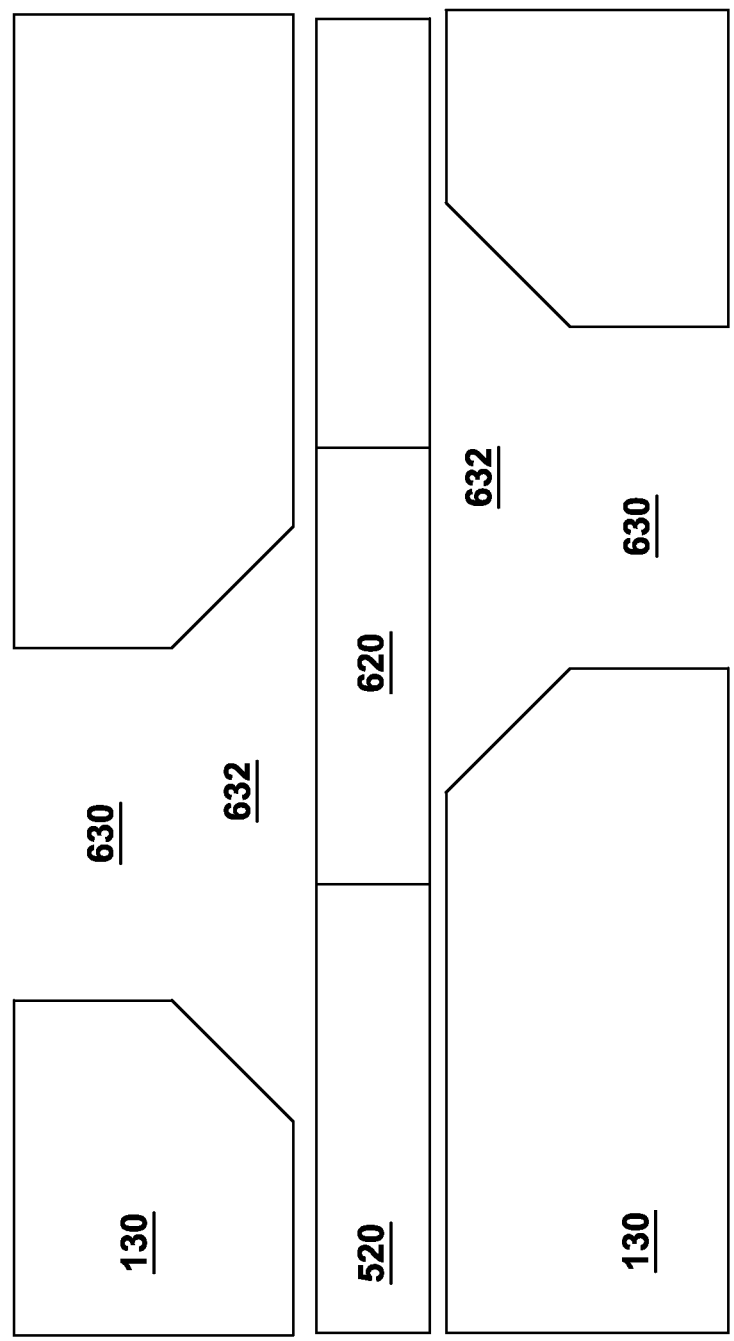

ROTOR WITH COOLING MANIFOLDS

BACKGROUND OF THE INVENTION

The disclosure relates generally to the direct cooling of electrical conductors in rotors of dynamoelectric machines. More particularly, the disclosure relates to a cooling manifold, which may be used alone or nested with other cooling manifolds, to directly cool such electrical conductors.

Dynamoelectric machines such as, e.g., generators, include a rotor having a plurality of axially extending slots disposed about the rotor circumference, into which the electrical conductors are inserted. In a direct cooled dynamoelectric machine, i.e., a dynamoelectric machine in which the machine is cooled directly by the atmosphere in which it operates, each slot may further include an axially extending subslot at a radially inward end of the slot for ventilation and cooling. The subslots are part of a ventilation scheme as known in the art, for transferring gas coolant axially along the rotor.

Radial cooling methods have been used for communicating cooling gas in a radially outward direction from the subslot through the conductors. However, radial flow cooling systems have typically only provided sufficient thermal performance for lower rated dynamoelectric machines. Diagonal flow cooling systems have been used in higher rated dynamoelectric machines due to their greater thermal performance, due in part to increased surface area. Diagonal flow cooling systems are, however, costly to implement.

BRIEF DESCRIPTION OF THE INVENTION

A first aspect of the disclosure provides a rotor for use in a dynamoelectric machine. The rotor includes a plurality of axially extending slots disposed about a body of the rotor; a plurality of conductors radially stacked within each of the axial slots; and an axially extending subslot disposed at a radially inward end of each of the slots. In each slot, a cooling path extends radially outwardly from the subslot, the cooling path comprising at least one manifold. Each manifold includes: at least one ingress passage extending in a substantially radially outward direction from the subslot at a first axial position along the slot, wherein the at least one ingress passage extends to a partial radial depth of the slot, at least one egress passage extending radially outwardly from a partial radial depth of the slot to the radially outer surface of the rotor, the at least one egress passage being disposed at a second axial position along the slot, axially distanced from the first axial position, and a plurality of axially extending passages in fluid connection at a first end with one of the at least one ingress passages, and at a second end with one of the at least one egress passages. Each of the plurality of axially extending passages is disposed at a different radial depth in the slot from each other axially extending passage.

A second aspect of the disclosure provides a rotor for use in a dynamoelectric machine. The rotor includes a plurality of axially extending slots disposed about a body of the rotor; a plurality of conductors radially stacked within each of the axial slots; and an axially extending subslot disposed at a radially inward end of each of the slots. In each slot, a cooling path extending radially outward from the subslot through the plurality of conductors, the cooling path comprising a plurality of nested manifolds, wherein each manifold in a nest of manifolds includes: an ingress passage extending radially outwardly from the subslot at a first axial position along the slot, wherein the ingress passage extends to a partial radial depth of the slot, an egress passage extending radially outwardly from a partial radial depth of the slot to the radially outer surface of the rotor, the egress passage being disposed at a second axial position along the slot, axially distanced from the first axial position, and a plurality of axially extending passages in fluid connection at a first end with the ingress passage, and at a second end with the egress passage, wherein each of the plurality of axially extending passages is disposed at a different radial depth in the slot from each other axially extending passage, wherein a total number of axially extending passages in the plurality of nested manifolds is equal to a number of conductors stacked within the slot.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 21 depicts a cross sectional view of a portion of the insulation disposed between two conductors of FIGS. 17-19, according to embodiments of the disclosure.

Figure 1:
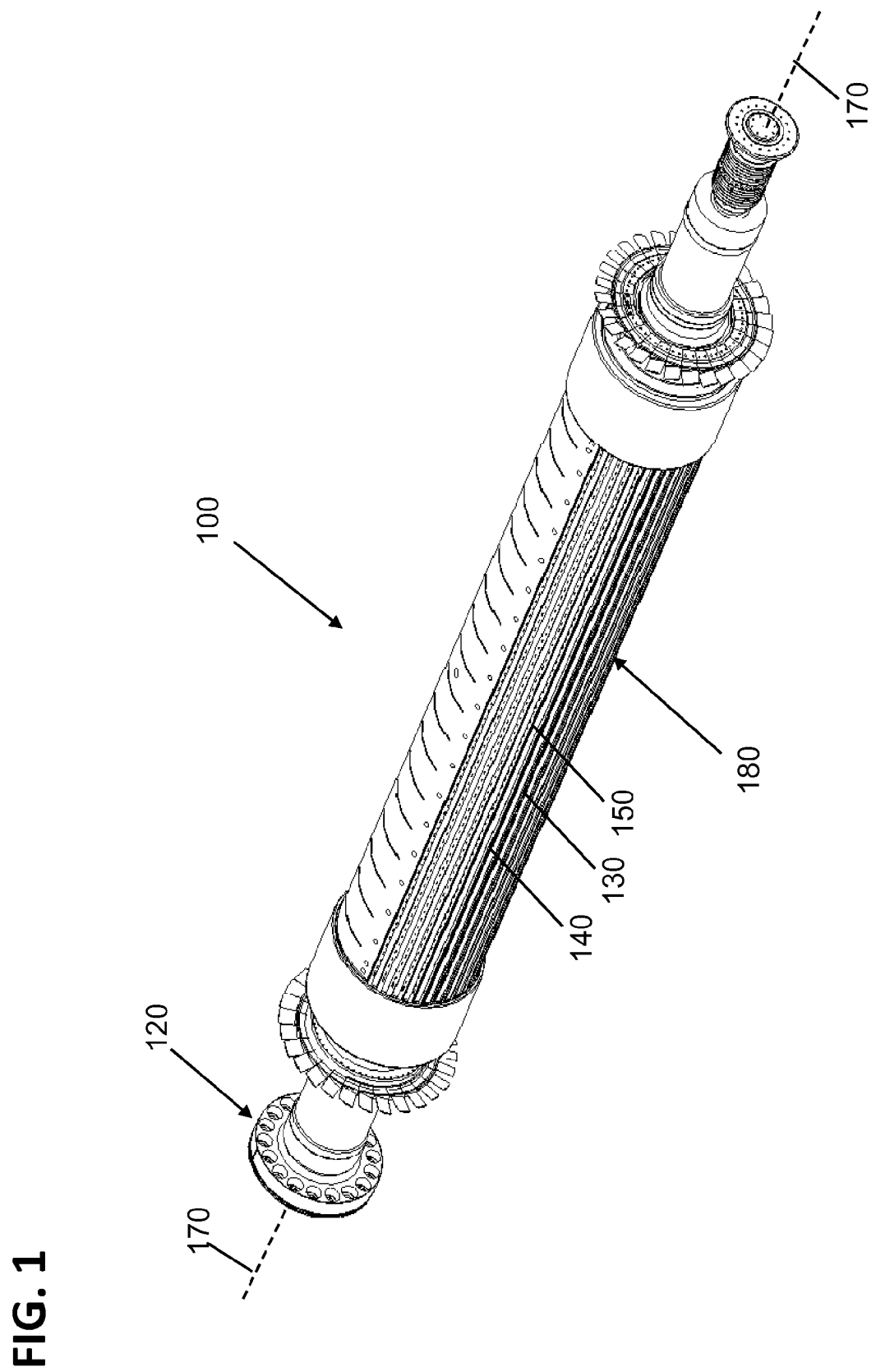
FIG. 1 depicts a perspective view of a rotor including rotor field conductors according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, FIGS. 1-23 illustrate different aspects of a rotor for use in a dynamoelectric machine such as, e.g., a generator. It is understood that the teachings of the present disclosure are also applicable to other dynamoelectric machines including but not limited to motors.

Figure 2:
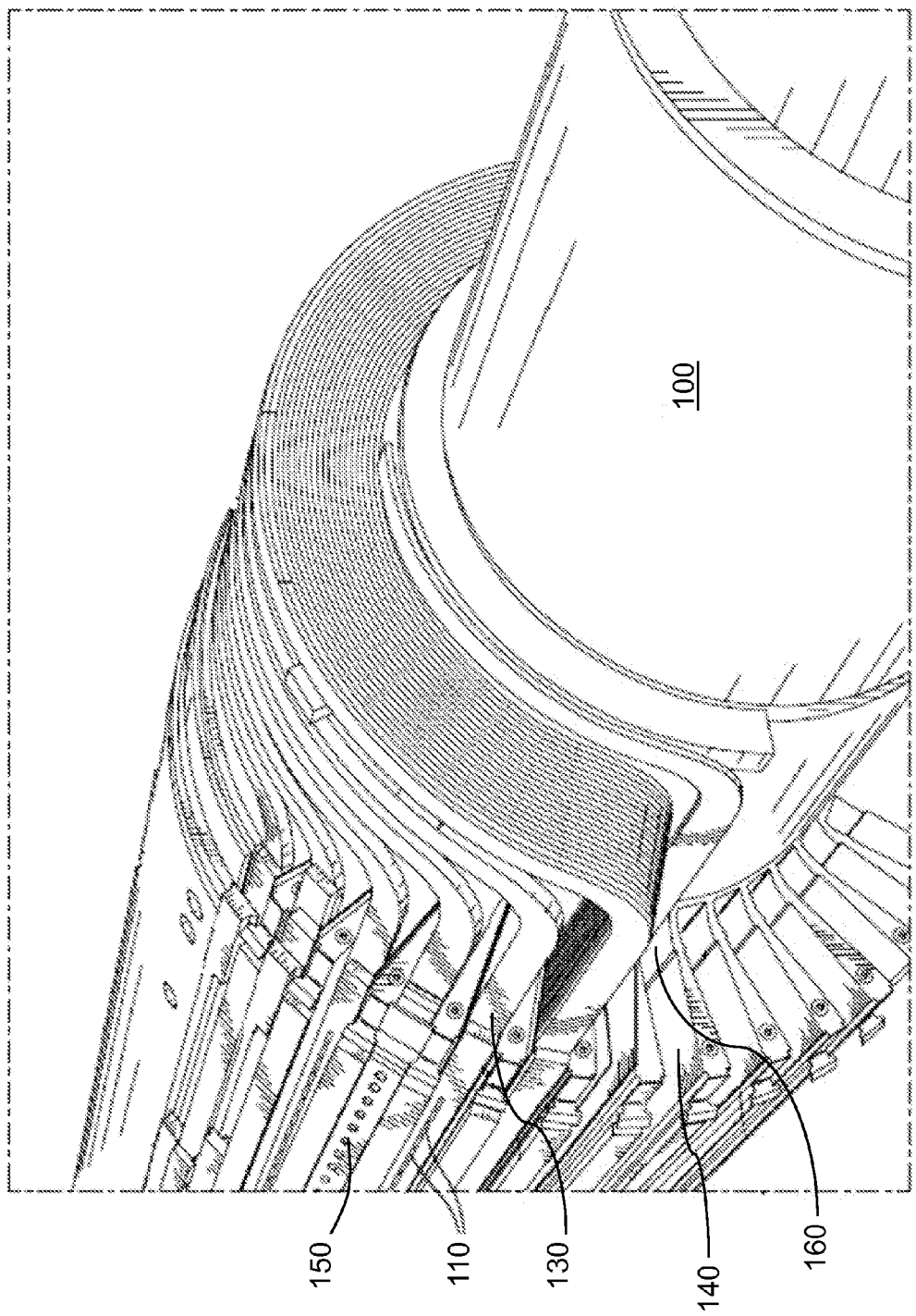
FIG. 2 depicts a perspective view of a portion of a rotor according to embodiments of the disclosure.

Turning to FIG. 1, a rotor 100 is shown. Rotor 100 includes a plurality of axially extending slots 140 disposed about a body 180 of the rotor 100. A plurality of conductors 130 are radially stacked within each of the axial slots 140. These conductors 130 are conductive coils made of, e.g., copper, which form the rotor field conductors. As shown in FIGS. 1-2, in various embodiments, conductors 130 may be held in place within slots 140 by coil wedges 150.

Referring back to FIG. 1, drive coupling 120 may be coupled to rotor 100, disposed between the generator and a source of mechanical energy, which may include a turbine or engine. Drive coupling 120 may be configured to rotate rotor 100 about longitudinal axis 170 with respect to a stator. Rotation of rotor 100 results in the generation of an electrical current in groups of coils affixed to the stator. The current is then transmitted away from the generator for use in a variety of applications.

Figure 3:
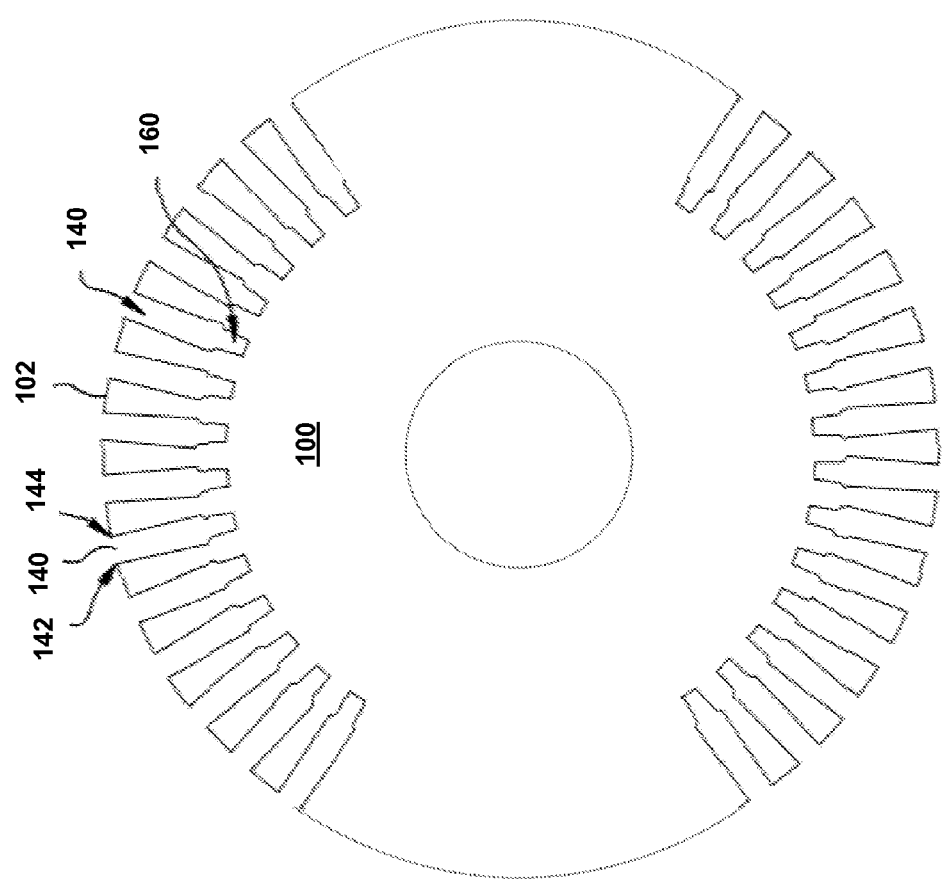
FIG. 3 depicts a cross sectional view of a portion of a rotor according to embodiments of the disclosure.

With reference to FIG. 2, each group of conductors 130 may contain a plurality of cooling pathways 110 to assist in cooling coils 130. Cooling pathways 110 provide a fluid pathway from an axially extending subslot 160, disposed at a radially inward end of each slot 140, to the outer surface 102 of rotor 100 (FIG. 3). In each slot 140, a cooling path 110 may extend radially outward from subslot 160 (FIG. 3). Cooling path 110 may include at least one manifold 200, shown in FIGS. 4-21.

Figure 4:
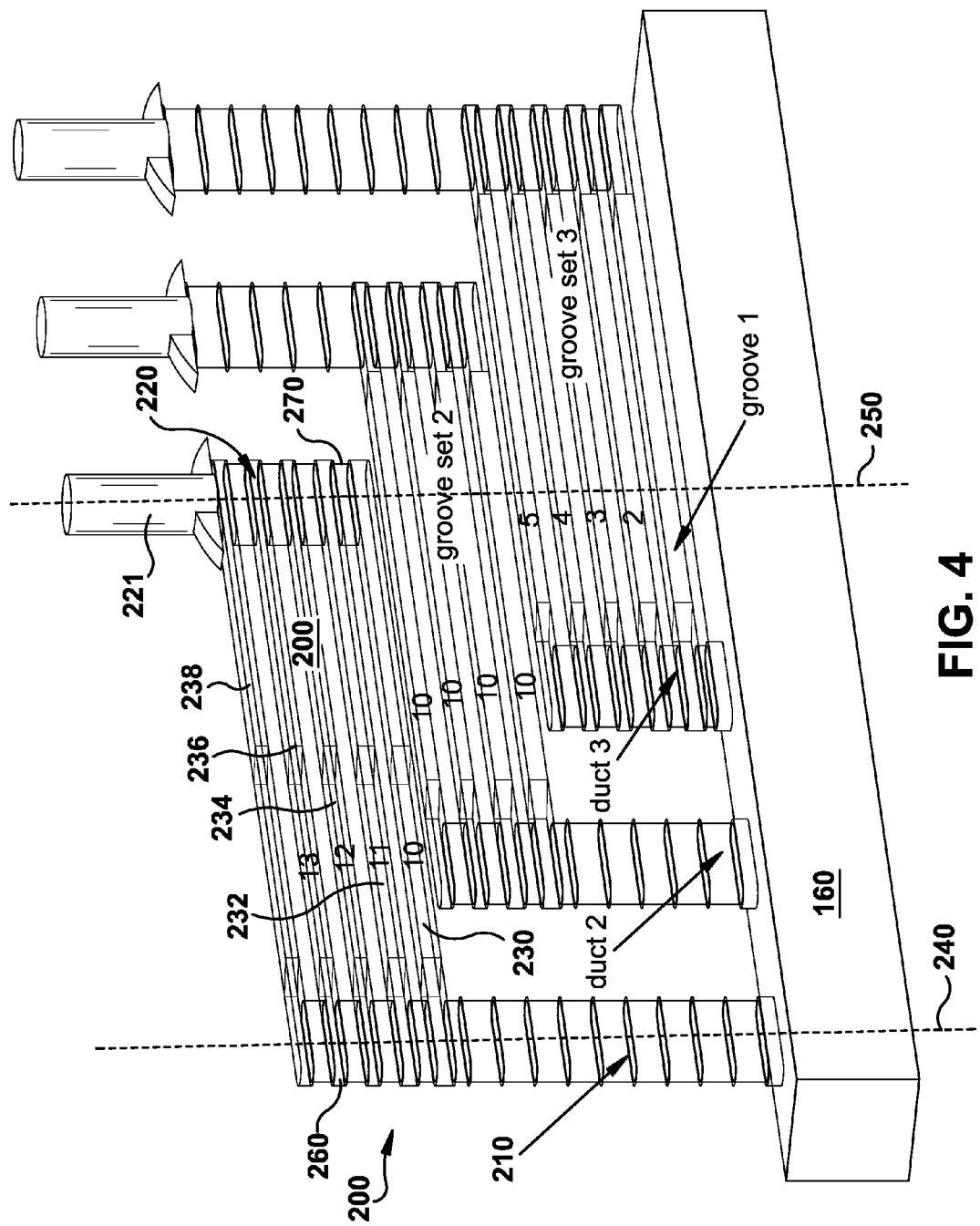
FIG. 4 depicts an isometric view of a portion of a rotor cooling according to embodiments of the disclosure.
Figure 18:
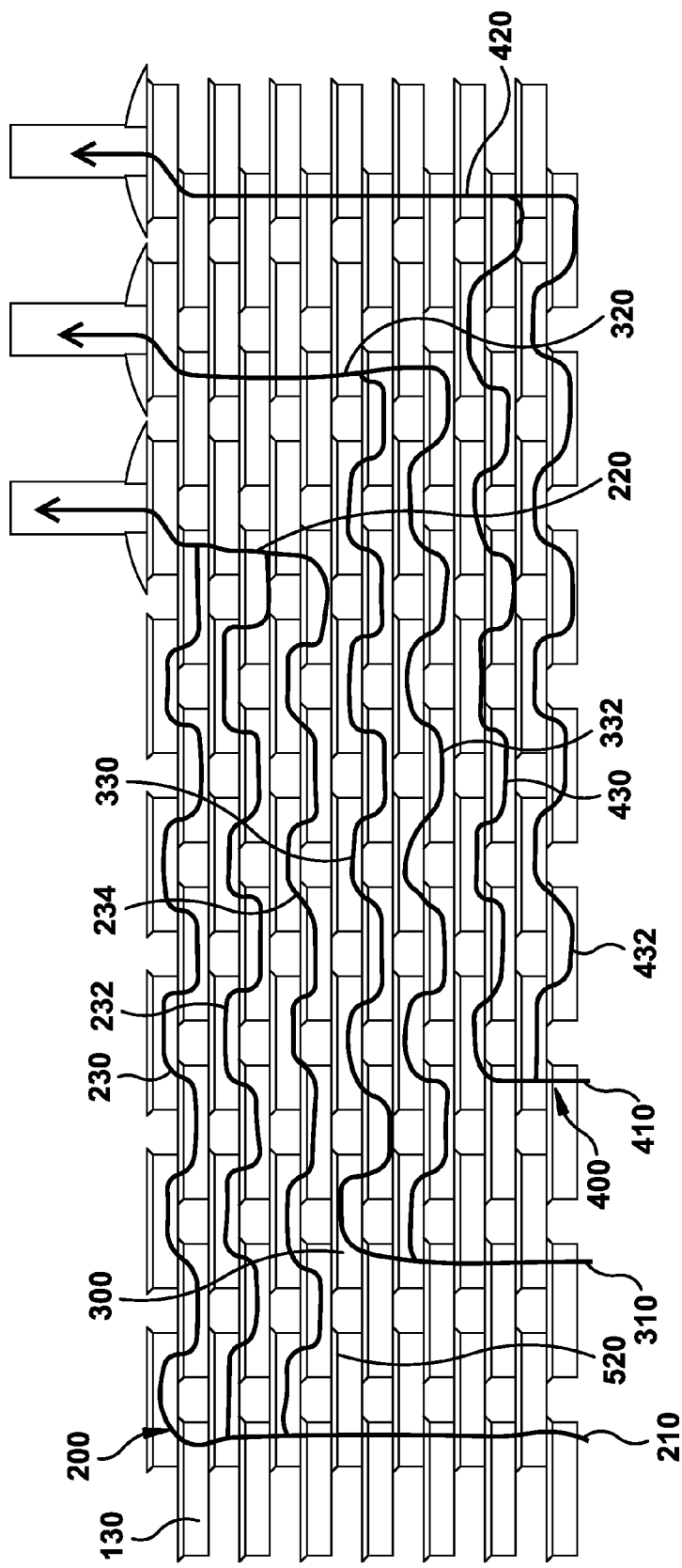
FIG. 18 depicts a cross sectional view of three nested manifolds according to an embodiment of the disclosure.
Figure 19:
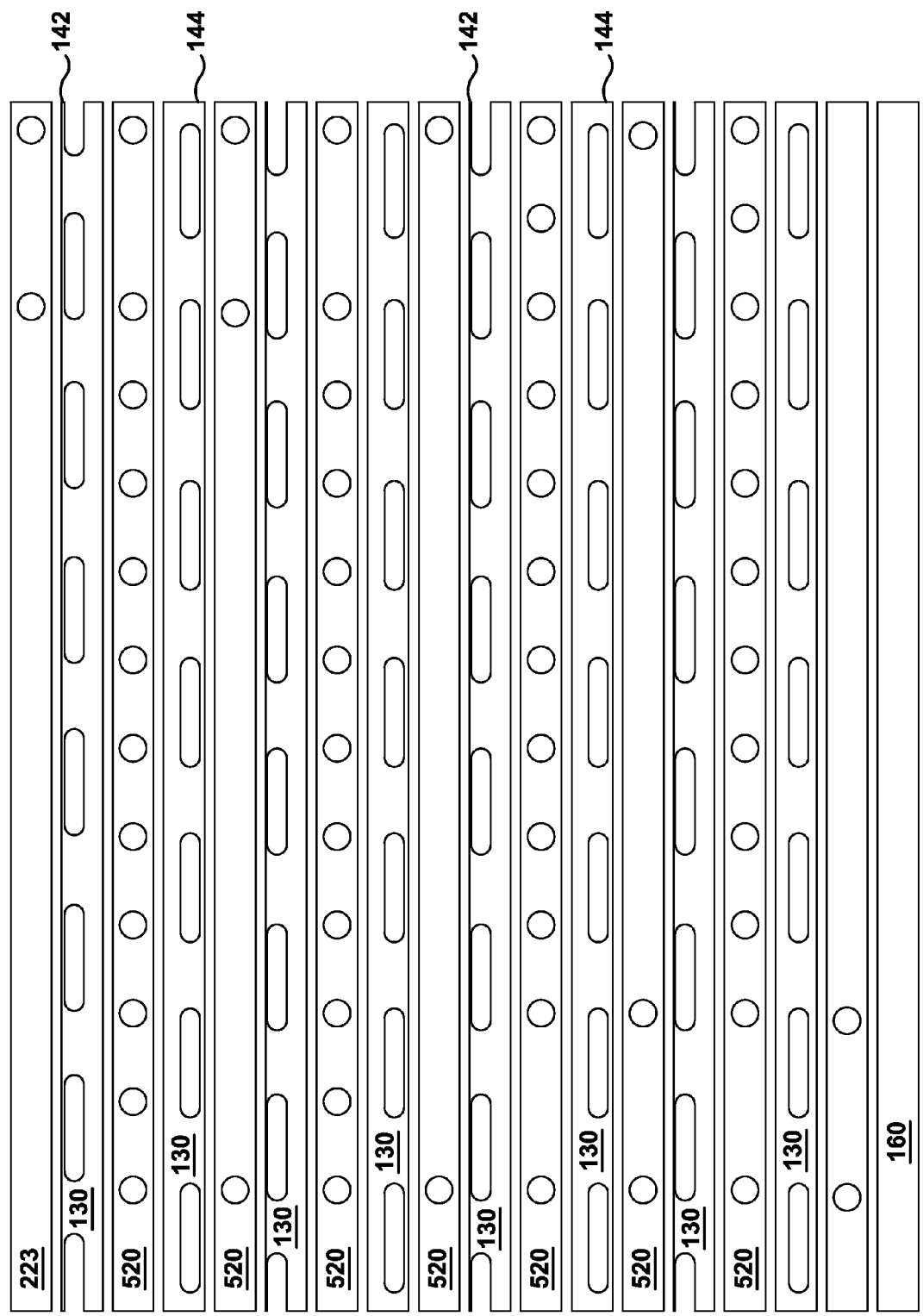
FIG. 19 depicts an exploded top view of the conductors disposed within slot 140 of FIG. 2, according to various embodiments of the disclosure.

As shown in FIG. 4, each manifold 200 includes a first ingress passage 210 extending radially outwardly from subslot 160 toward an outer surface 102 of rotor 100 (FIG. 3) at a first axial position 240 along subslot 160. First ingress passage 210 extends to a partial radial depth of the slot 140, i.e., ingress passage 210 does not extend all the way to the outer surface 102 of rotor 100 (FIG. 3). A first egress passage 220 extends radially outwardly from a partial radial depth of slot 140 to the radially outer surface 102 of the rotor 100, i.e., first egress passage 220 extends radially outwardly from a mid-depth between subslot 160 and outer surface 102, to outer surface 102 of rotor 100 (FIG. 3). First egress passage 220 may terminate with a chimney 221, which may extend radially outward through a creepage block 223 (FIGS. 18, 19, 21). First egress passage 220 is disposed at a second axial position 250 along subslot 160, which is axially distanced from first axial position 240. In various embodiments, first ingress passage 210 and first egress passage 220 may be substantially parallel to one another, and may each extend radially outward at an angle that is either substantially perpendicular to (FIGS. 4-12, 14), or not substantially perpendicular to (FIGS. 13, 15-17) subslot 160.

Figure 8:
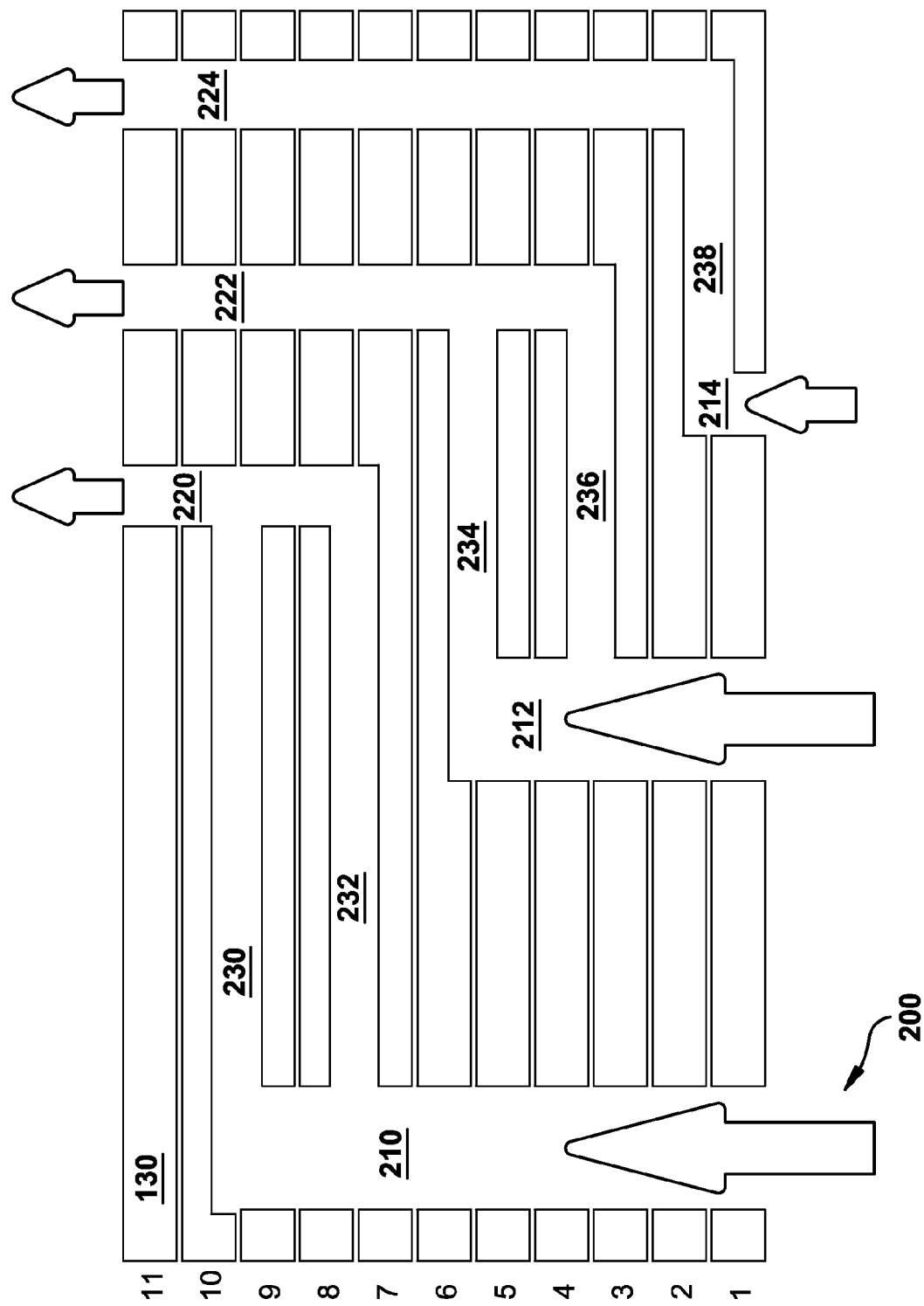

Referring back to FIG. 4, a plurality of axially extending passages 230, 232, 234, 236, 238 are positioned such that they are fluidly connected at a first end 260 with first ingress passage 210, and at a second end 270 with first egress passage 220. As shown in FIG. 4, each of the plurality of axially extending passages 230, 232, 234, 236, 238 is disposed at a different radial depth relative to subslot 160 from each other axially extending passage 230, 232, 234, 236, 238. It is further noted that although five radially extending passages are shown in FIG. 4, any number of axially extending passages may be included in manifold 200. For example, embodiments in which manifold 200 includes two axially extending passages are shown in FIGS. 8, 18, and 19; embodiments in which manifold 200 includes three axially extending passages are shown in FIGS. 13-17. In each embodiment, each axially extending passage 230, 232, 234, 236, 238 may have an independently selected cross sectional area, to optimize centrifugal loading and distribution of flow.

A variety of configurations of first manifold 200 are considered part of the invention, as illustrated in FIGS. 5-10.

It is noted that the configurations depicted are merely exemplary; other configurations are also considered part of the disclosure. It is further noted that aspects of each of these figures may be combined with aspects of other figures presented herein. In the interest of brevity, each possible combination of features is not separately depicted.

Figure 5:
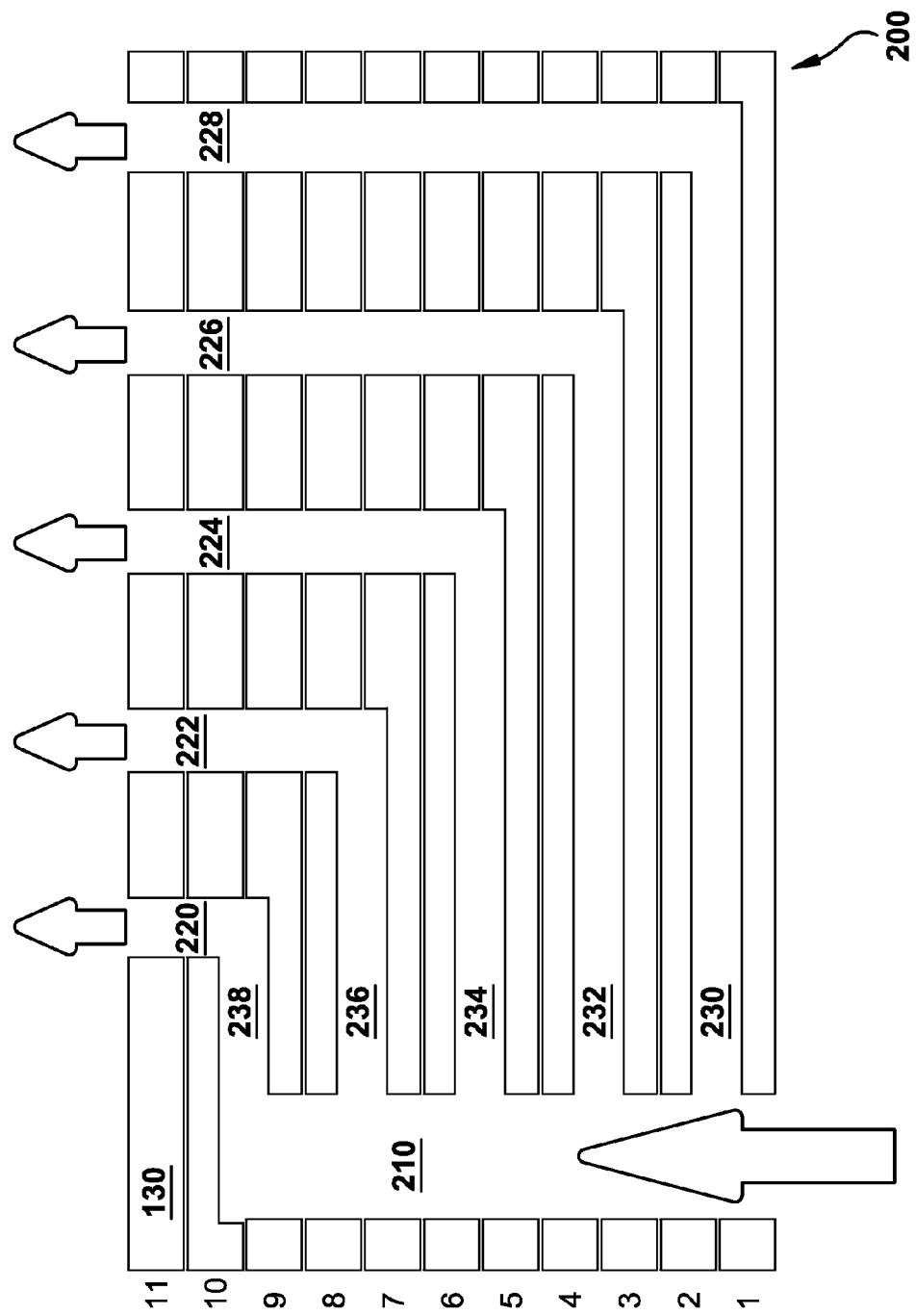
FIGS. 5-15 depict cross sectional schematic views of cooling pathways in a rotor according to embodiments of the disclosure.
Figure 6:
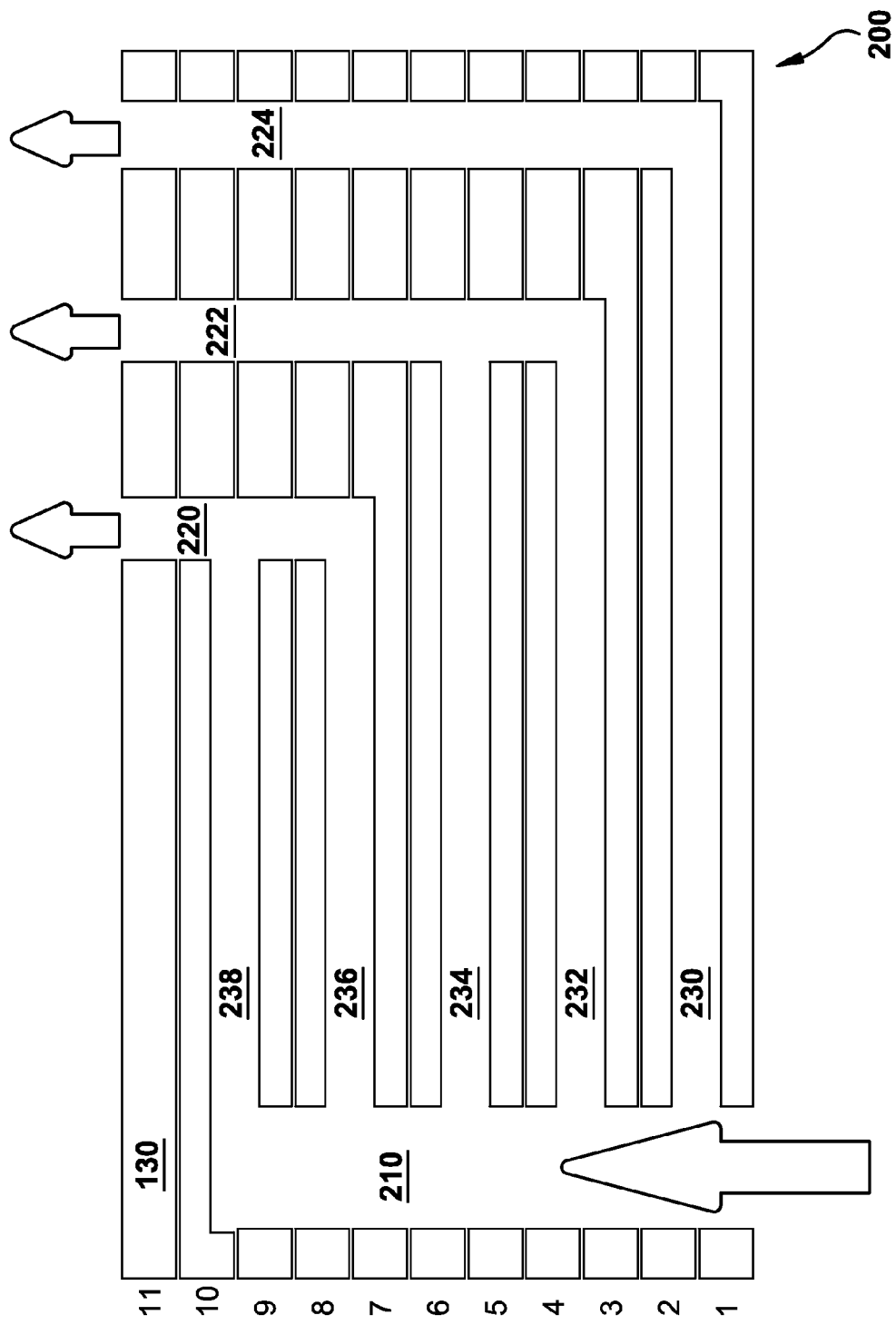
Figure 7:
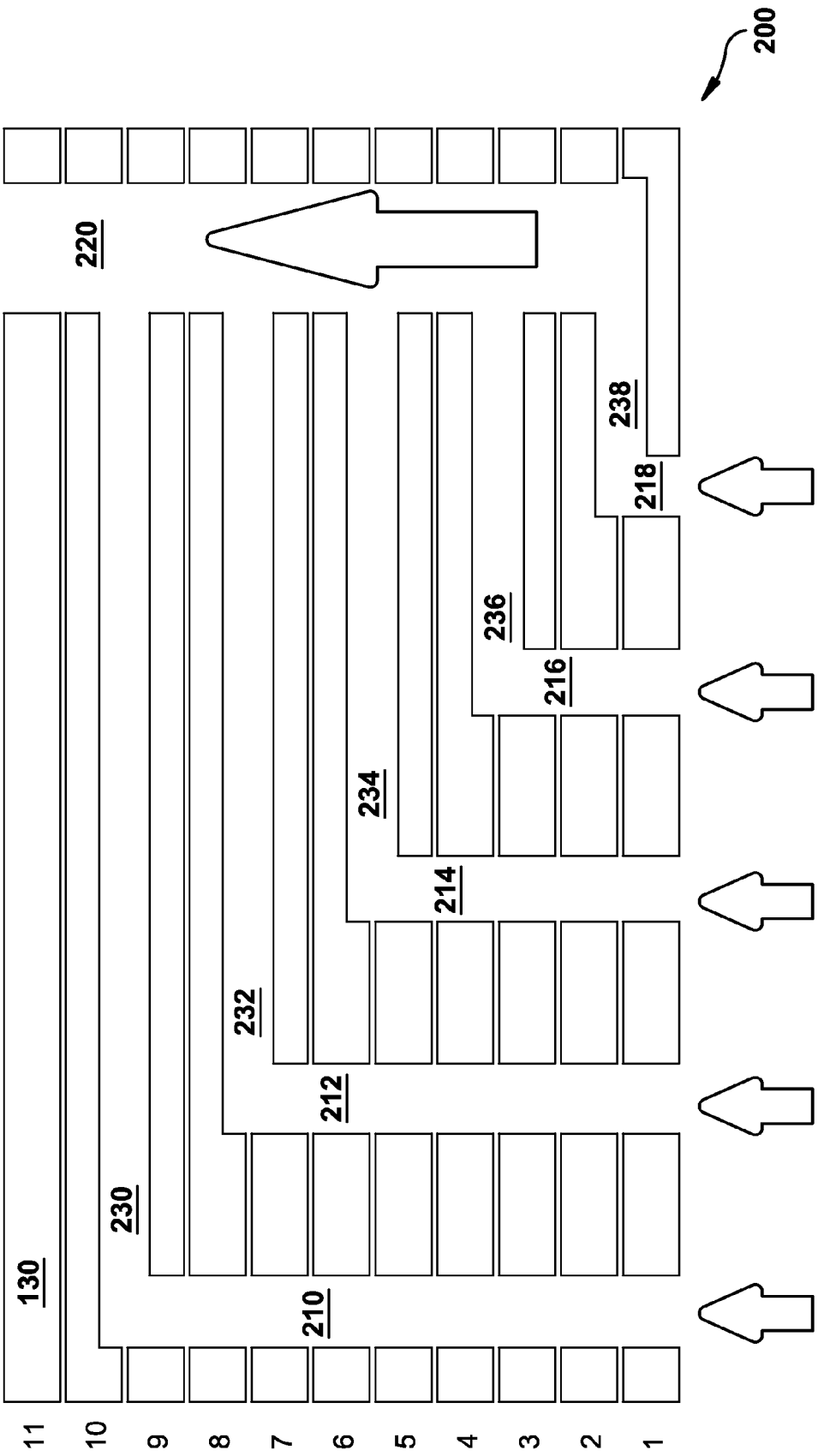
Figure 9:
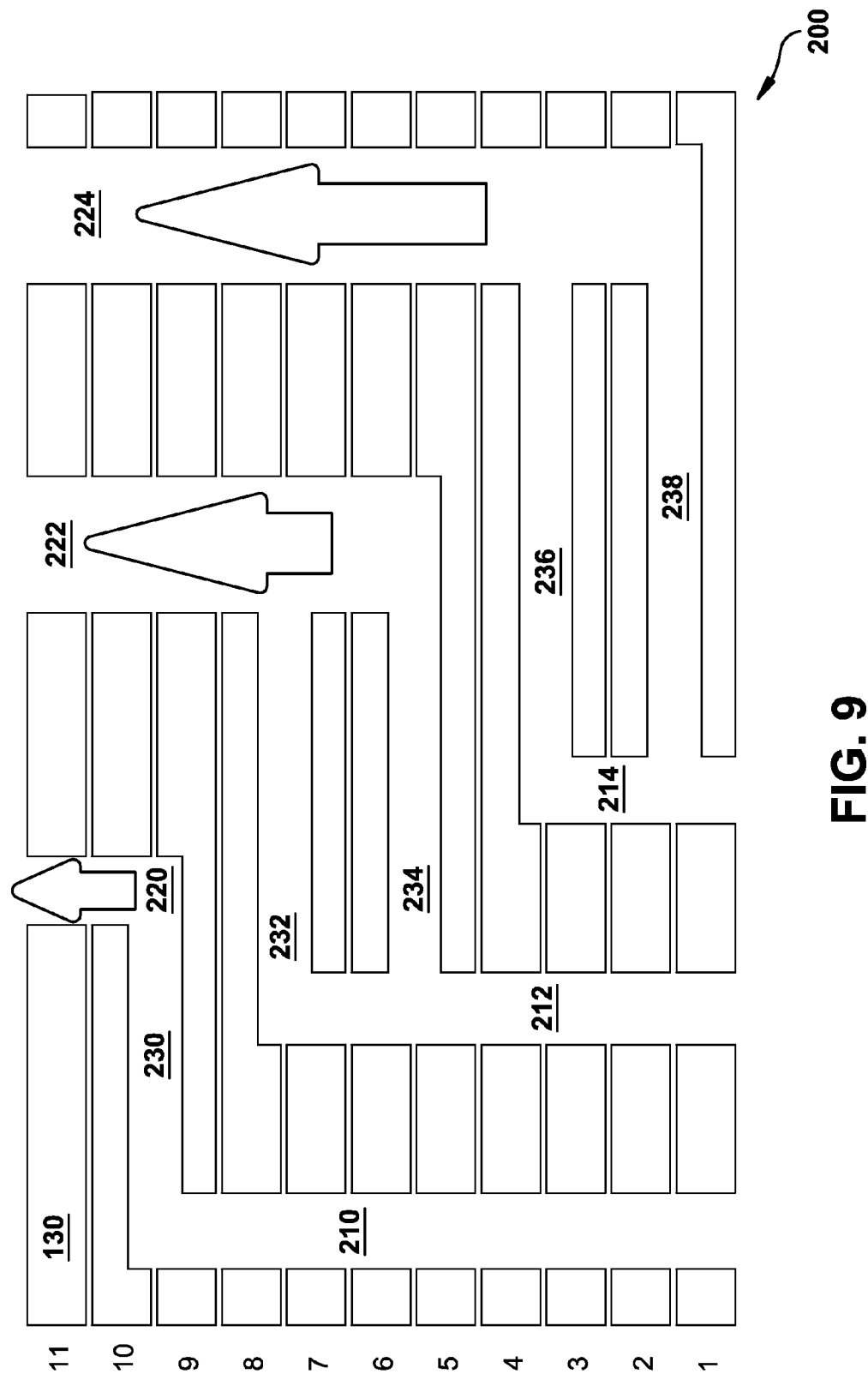
Figure 10:
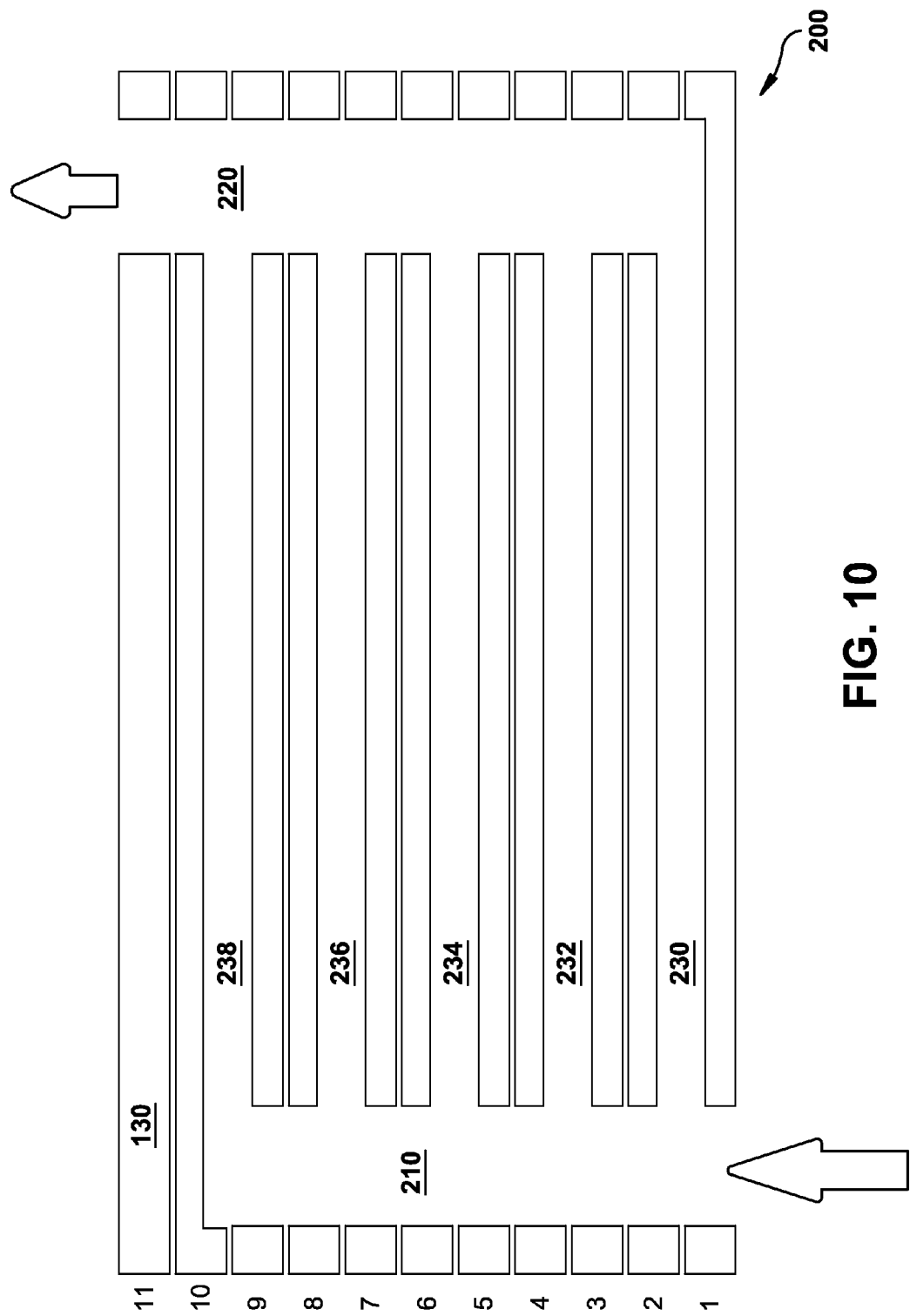

As shown in FIGS. 5, 6, and 10, some embodiments include a first ingress passage 210 which supplies each of the plurality of axially extending passages 230, 232, 234, 236, 238 with cooling fluid. In other embodiments, as shown in FIGS. 7-9, manifold 200 may include a plurality of ingress passages contributing to the cooling path of manifold 200. In such embodiments, a second ingress passage 212 (FIGS. 7-9), a third ingress passage 214 (FIGS. 7-9), a fourth ingress passage 216, and a fifth ingress passage 218 (FIG. 7) may further be provided. Each ingress passage 210, 212, 214, 216, 218 may feed one or more of the plurality of axially extending passages 230, 232, 234, 236, 238 with cooling fluid. For example, in FIG. 7, a one to one relationship is depicted between each ingress passage 210, 212, 214, 216, 218 and each axially extending passage 230, 232, 234, 236, 238. As shown in FIGS. 8-9, one to more than one relationships are depicted between ingress passages 210 (FIG. 8 only), 212 (FIGS. 8 and 9), 214 (FIG. 9 only) and axially extending passages 230, 232, 234, 236, 238. In the exemplary embodiment shown in FIG. 8, a manifold 200 is depicted, including a combination of ingress passage 214 feeding a single axially extending passage 238, and ingress passages 210, 212 feeding a plurality of axially extending passages 230, 232 and 234, 236 respectively. In another example embodiment, FIG. 9 depicts manifold 200 including a combination of ingress passage 210 feeding a single axially extending passage 230, ingress passage 212 feeding a plurality of axially extending passages 232, 234, and ingress passage 214 feeding a plurality of axially extending passages 236, 238. As noted above, other embodiments are also considered part of the disclosure. For example, all of the ingress passages may feed a plurality of axially extending passages, and varied numbers of axially extending passages may be fed by each ingress passage.

Similarly, as shown in FIGS. 7 and 10, each embodiment includes at least a first egress passage 220 which is fed by the plurality of axially extending passages 230, 232, 234, 236, 238. In some embodiments, such as those shown in FIGS. 5, 6, 8, and 9, manifold 200 may include a plurality of egress passages 220, 222, 224, 226, 228. In such embodiments, a second egress passage 222 (FIGS. 5, 6, 8, 9), a third egress passage 224 (FIGS. 5, 6, 8, 9), a fourth ingress passage 226 (FIG. 5), and a fifth ingress passage 228 (FIG. 5) may further be provided. Each egress passage 220, 222, 224, 226, 228 may be fed cooling fluid by one or more of the plurality of axially extending passages 230, 232, 234, 236, 238. For example, in FIG. 5, a one to one relationship is depicted between each egress passage 220, 222, 224, 226, 228 and an axially extending passage 230, 232, 234, 236, 238. As shown in FIGS. 6 and 8-9, one to more than one relationships are depicted between egress passages 220, 222, 224 and axially extending passages 230, 232, 234, 236, 238. In the example embodiment shown in FIG. 6, a manifold 200 is depicted having a combination of an egress passage 224 fed by a single axially extending passage 230, and egress passages 220, 222, fed by a plurality of axially extending passages 232, 234 and 236, 238 respectively. In another example embodiment, FIG. 8 depicts manifold 200 having a combination of an egress passage 224 fed by a single axially extending passage 238, and egress passages 220, 222, each fed by a plurality of axially extending passages 230, 232 and 234, 236 respectively. In another example embodiment, FIG. 9 depicts manifold 200 having a combination of an egress passage 220 fed by a single axially extending passage 230, and egress passages 222, 224, each fed by a plurality of axially extending passages 232, 234 and 236, 238 respectively. As noted above, other embodiments are also considered part of the disclosure, e.g., all of the egress passages may be fed by a plurality of axially extending passages, and varied numbers of axially extending passages may feed each egress passage.

Figure 11:
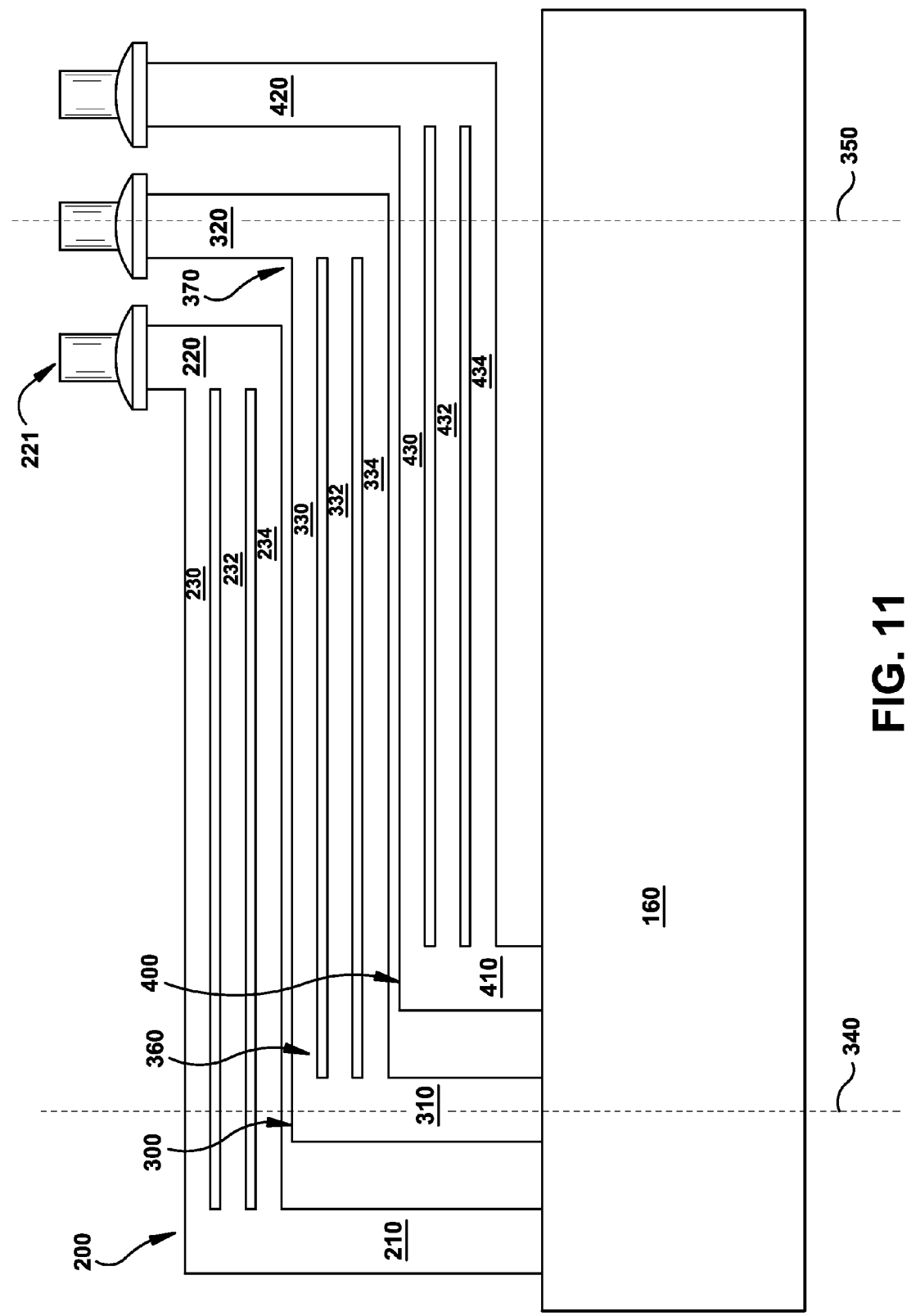
Figure 12:
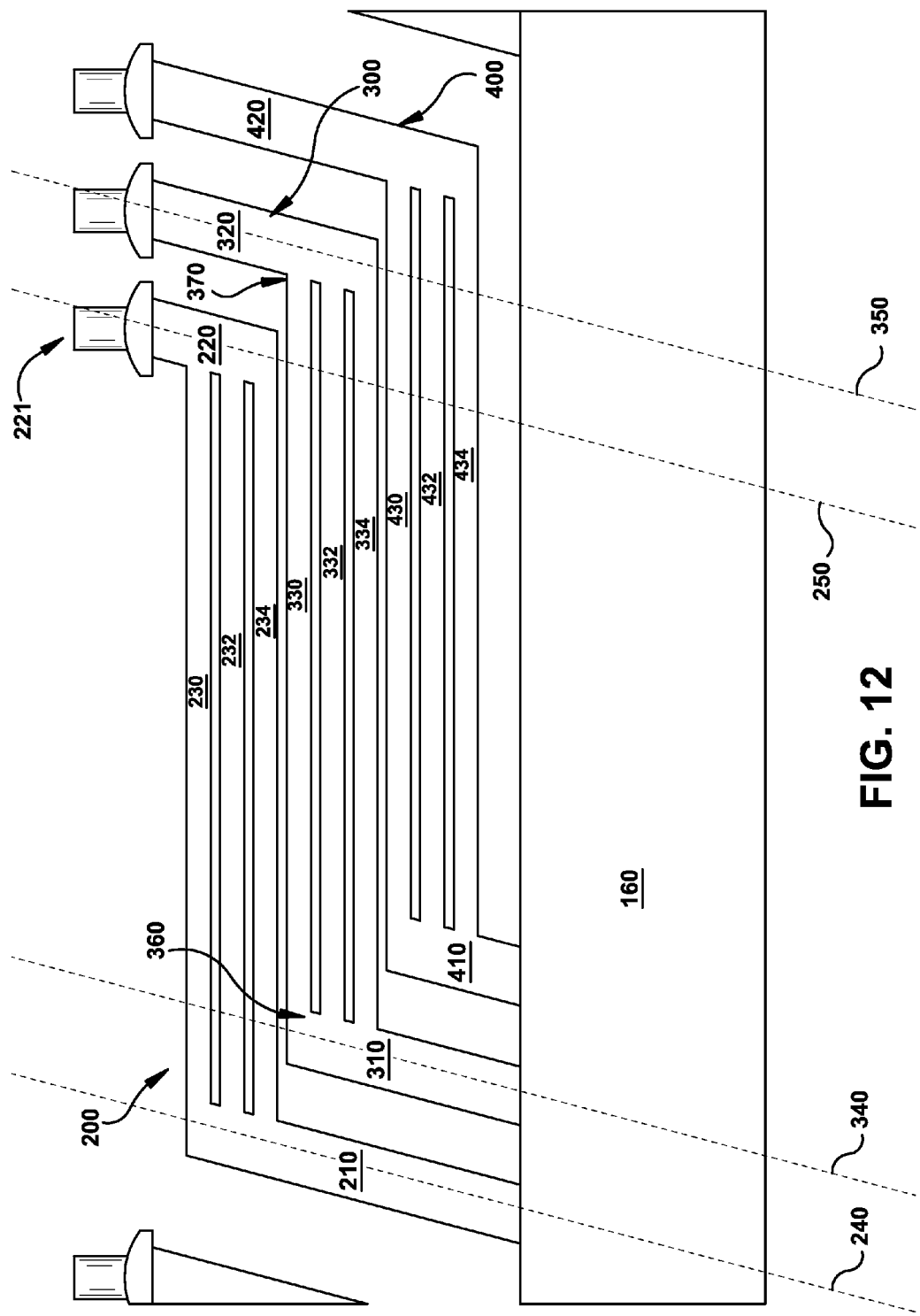
Figure 13:
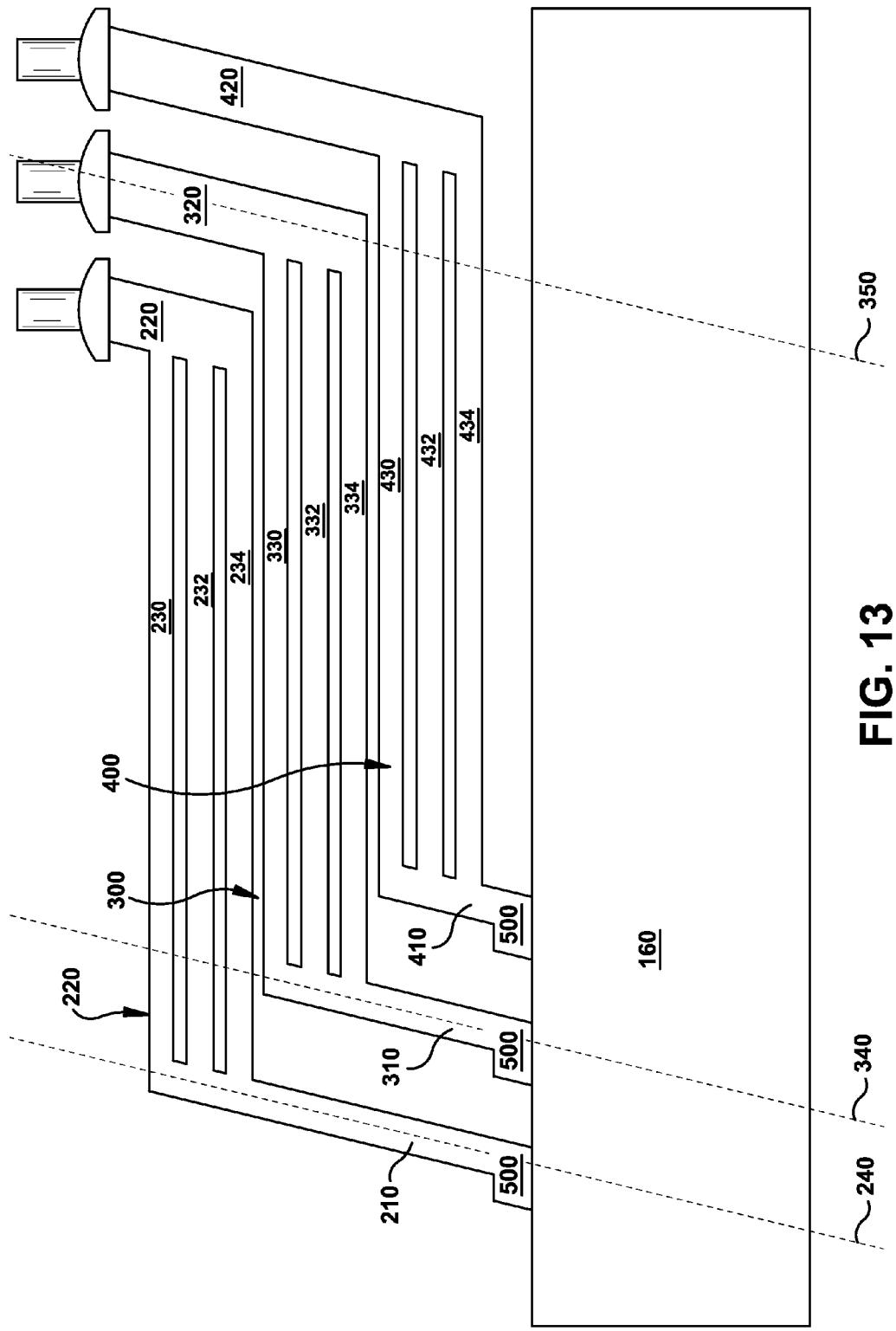
Figure 14:
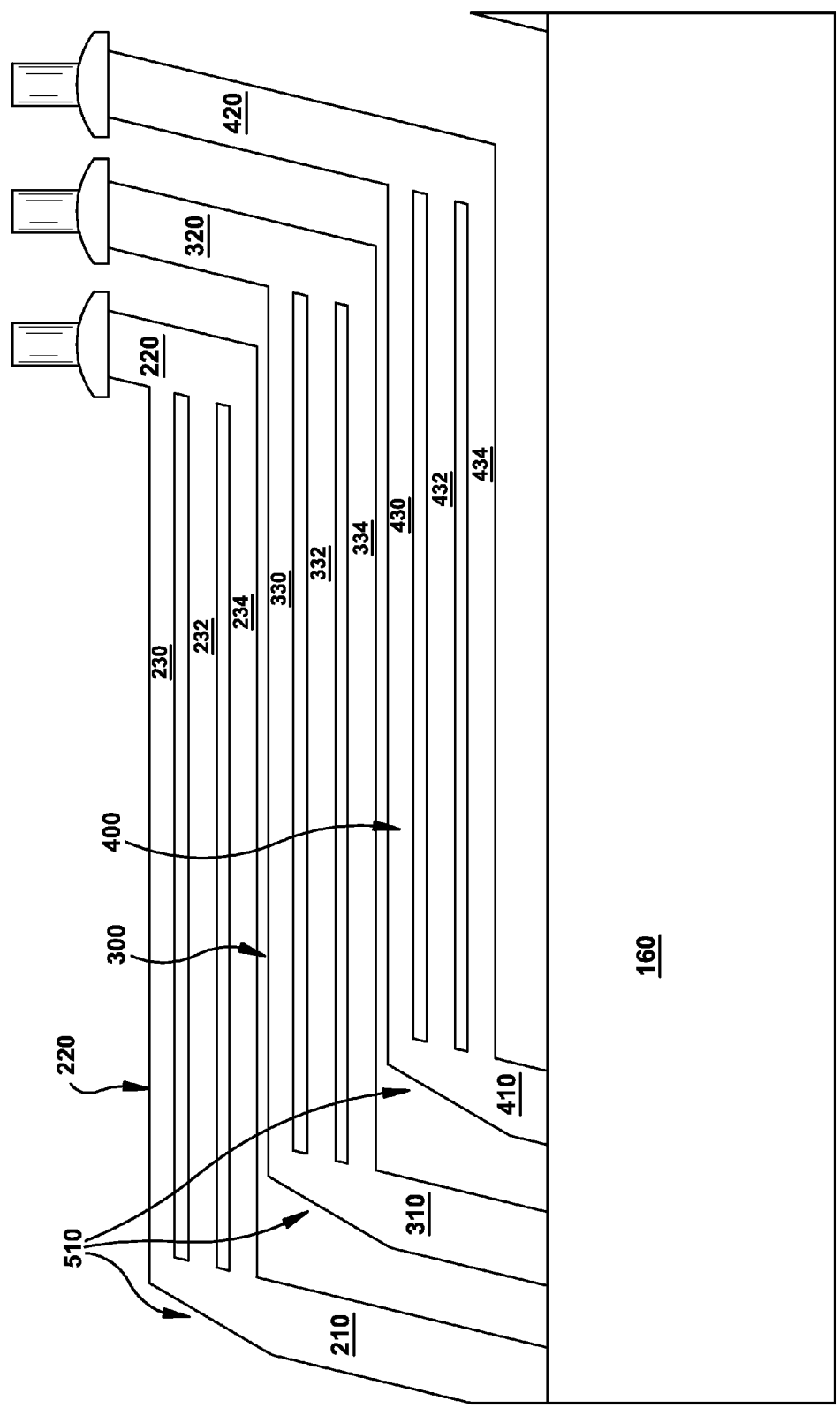

As shown in FIGS. 11-17, in a variety of embodiments, a second manifold 300 may be provided in addition to manifold 200. The second manifold 300 may include features analogous to those described above relative to first manifold 200. Analogous features in manifolds 200, 300 are denoted by reference signs having the same second and third digits in the 200 and 300 series, e.g., ingress passages 210, 310. For example, second manifold 300 may include a first ingress passage 310 extending radially outwardly from subslot 160 toward an outer surface 102 of rotor 100 (FIG. 3) at a first axial position 340 along subslot 160. First ingress passage 310 may extend to a partial radial depth of the slot 140, i.e., ingress passage 310 does not extend all the way to the outer surface 102 of rotor 100 (FIG. 3). A first egress passage 320 may extend radially outwardly from a partial radial depth of slot 140 to the radially outer surface 102 of the rotor 100, i.e., first egress passage 320 may extend radially outwardly from a mid-depth between subslot 160 and outer surface 102, to outer surface 102 of rotor 100. First egress passage 320 is disposed at a second axial position 350 (FIGS. 11-14) along subslot 160, which is axially distanced from first axial position 340. In various embodiments, first ingress passage 310 and first egress passage 320 may be substantially parallel to one another. In some embodiments, first ingress passage 310 and first egress passage 320 may each extend radially outward at an angle that is either substantially perpendicular to subslot 160, as shown in FIG. 11, or not substantially perpendicular to subslot 160, as shown in FIGS. 12-14.

Referring back to FIGS. 11-14, a plurality of axially extending passages 330, 332, 334 are positioned such that they are fluidly connected at a first end 360 with first ingress passage 310, and at a second end 370 with first egress passages 320. Each of the plurality of axially extending passages 330, 332, 334, and when present, axially extending passages is disposed at a different radial depth from each other axially extending passage 330, 332, 334 relative to subslot 160. It is further noted that although nine radially extending passages are shown in FIGS. 11, 12, and 14, including three axially extending passages 330, 332, 334 in manifold 300, any number of axially extending passages may be included in manifold 300. In each embodiment, each axially extending passage 330, 332, 334 may have an independently selected cross sectional area, to optimize centrifugal loading and distribution of flow.

In further embodiments, with continued reference to FIGS. 11-14 and 17, a plurality of manifolds 200, 300, 400 may be provided. As noted above with regard to manifold 300, manifold 400 may include features analogous to those described above with regard to manifold 200. Analogous features are denoted by reference signs having the same second and third digits in the 200, 300, and 400 series (e.g., ingress passages 210, 310, 410).

The plurality of manifolds 200, 300, 400 may be nested such that each ingress passage 210, 310, 410 is axially distanced from each other ingress passage 210, 310, 410, and each egress passage 220, 320, 420 is axially distanced from each other egress passage 220, 320, 420. Manifold 200 may further include a plurality of axially extending passages 230, 232, 234, arranged as described previously. Manifolds 300, 400 may include analogous axially extending passages 330, 332, 334 in manifold 300, and 430, 432, 434 in manifold 400. In some embodiments, each of the plurality of axially extending passages 230, 232, 234, 330, 332, 334, 430, 432, 434 in each manifold 200, 300, 400 may have substantially the same axial length, although the axially extending passages 230, 232, 234, 330, 332, 334, 430, 432, 434 need not all have exactly the same axial length.

With continued reference to FIGS. 11-14, each of which includes three nested manifolds 200, 300, 400, it is noted that fewer or greater numbers of manifolds may be nested in various embodiments. Three nested manifolds are shown merely by way of example. In some embodiments, as shown in FIG. 11, a total number of axially extending passages 230, 232, 234, 330, 332, 334, 430, 432, 434, in the plurality of nested manifolds 200, 300, 400 is equal to a number of conductors 130 stacked within slot 140 (FIG. 2). Additionally, a number of variations in the geometry of manifolds 200, 300, 400 are considered part of the disclosure. For example, as shown in FIGS. 12-14, ingress passages 210, 310, 410, and egress passages 220, 320, 420 may extend radially outward at an angle that is not perpendicular to subslot 140, whereas in the embodiments shown in FIG. 11, ingress passages 210, 310, 410, and egress passages 220, 320, 420 may extend radially outward at an angle that is perpendicular to subslot 140.

As shown in FIG. 13, a step 500 may be provided at a junction between each ingress passage 210, 310, 410 and subslot 160. This step provides a larger opening for cooling gas to flow from subslot 160 into ingress passage 210, 310, 410. A further embodiment is shown in FIG. 14, which illustrates an angling 510 of ingress passage 210, 310, 410, which further directs the flow of cooling gas toward the respective axially extending passages, and helps equalize the flow.

Figure 15:
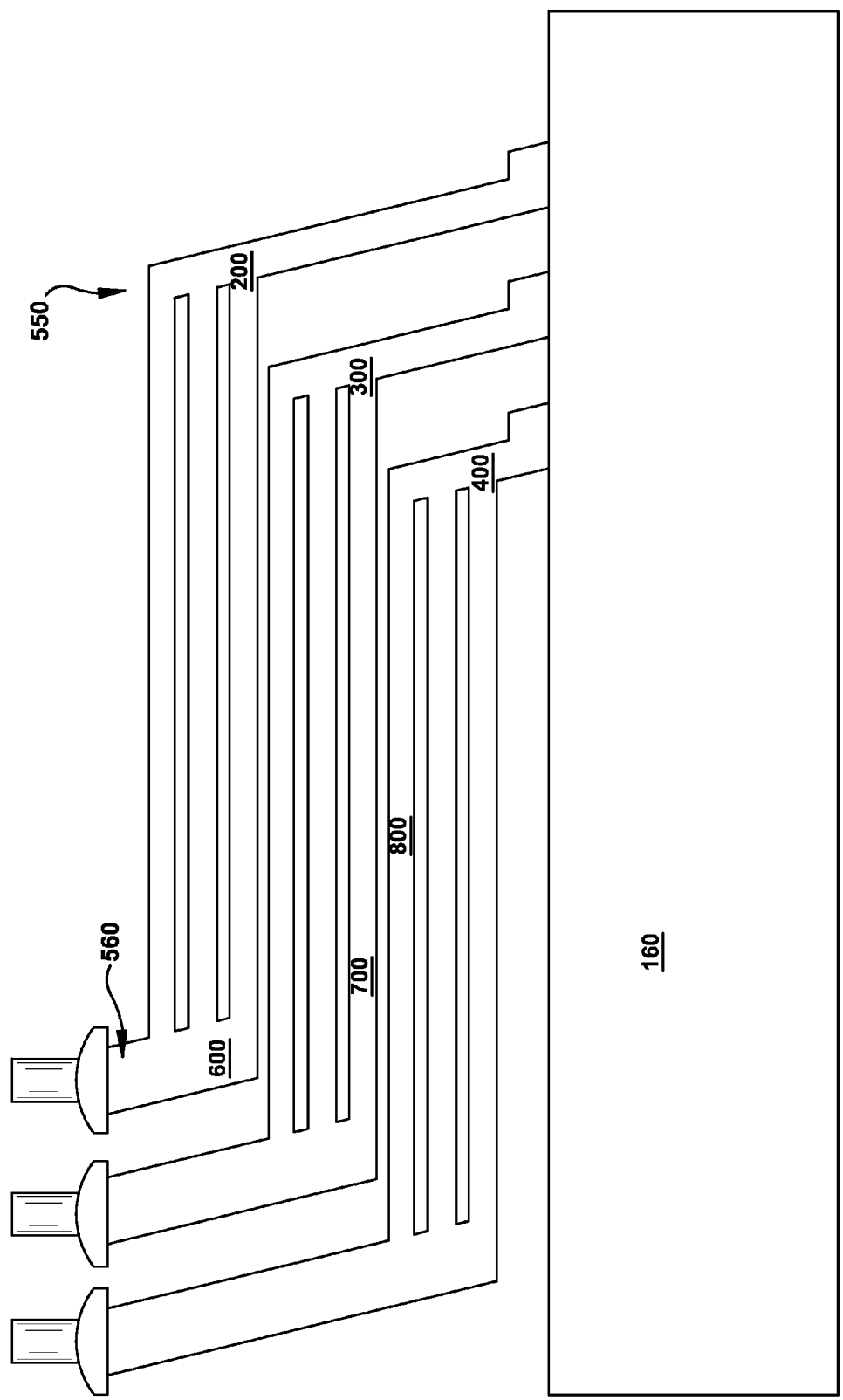
Figure 16:
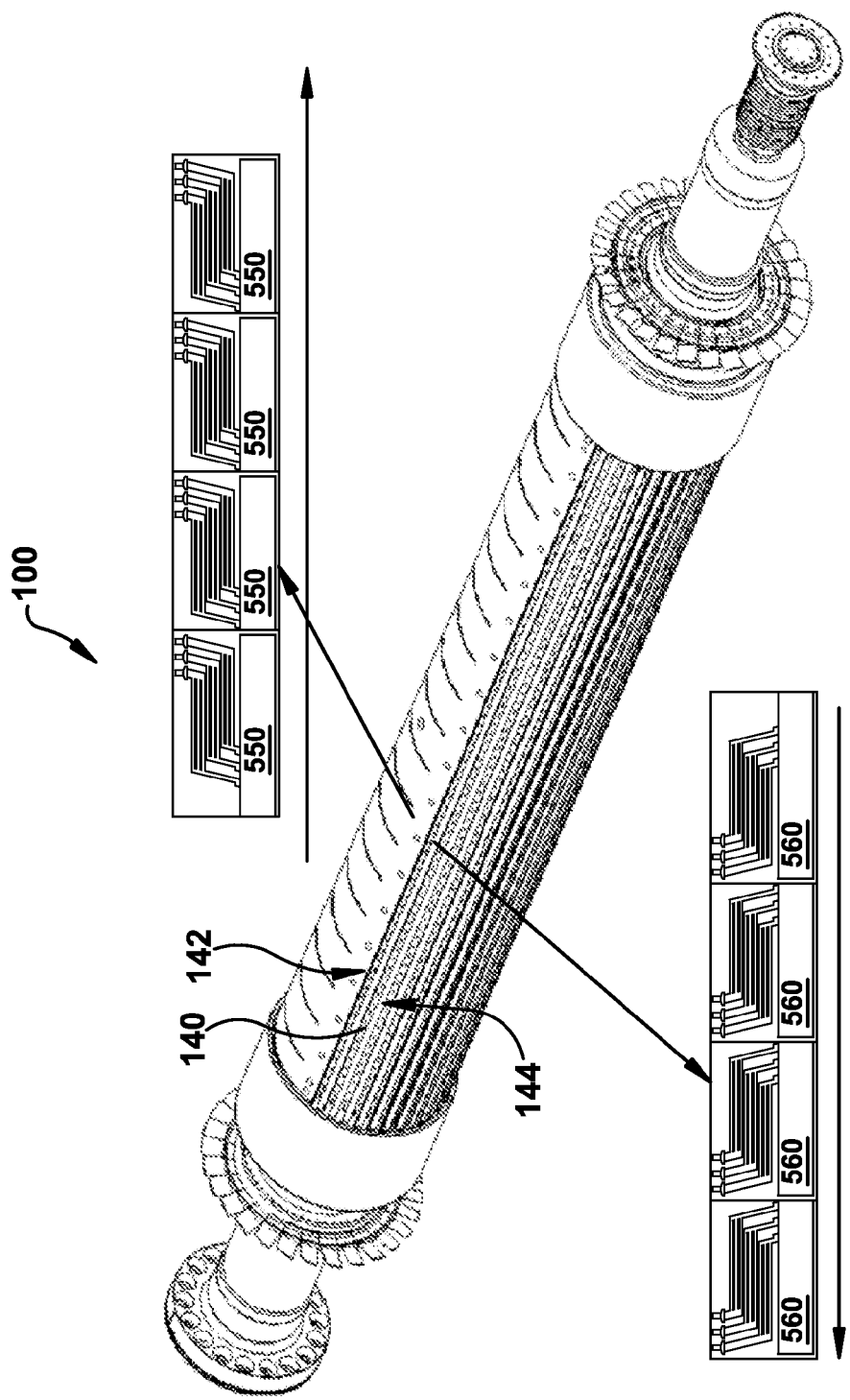
FIG. 16 depicts an exploded perspective view of a rotor according to embodiments of the disclosure.

In another embodiment, shown in FIG. 15, a first nest 550 of manifolds 200, 300, 400 and second nest 560 of manifolds 500, 600, 700 may be arranged such that second nest 560 of manifolds 600, 700, 800 is laterally displaced from, and axially aligned with, the first nest 550 of manifolds 200, 300, 400. In this arrangement, second nest 560 provides a fluid flow path in an axial direction that is opposite of a fluid flow path provided by the first nest 550. Thus, as shown in FIGS. 15-16, the first nest 550 of manifolds 200, 300, 400 is disposed along side of the second nest 560 of manifolds 600, 700, 800, spanning the same axial region. The first nest 550 of manifolds 200, 300, 400 occupies leading edge 142 of slot 140 and the second nest 560 of manifolds 600, 700, 800 occupies the trailing edge 144 of slot 140 (or vice-versa).

As noted above, and as shown in FIG. 16, in some embodiments, rotor 100 (FIGS. 1-2) may be divided into sections along an axial length thereof, each section including a manifold 200 or a nest 550 of manifolds 200, 300, 400. Each section may be approximately the same length as manifold 200 or the nest of manifolds 200, 300, 400 disposed therein. In further embodiments, the sections and the nests 550 of manifolds 200, 300, 400 disposed near the ends of rotor 100 may be axially shorter than the sections and the nests 550 of manifolds 200, 300, 400 disposed in or toward the center of the axial length of rotor 100.

Figure 17:
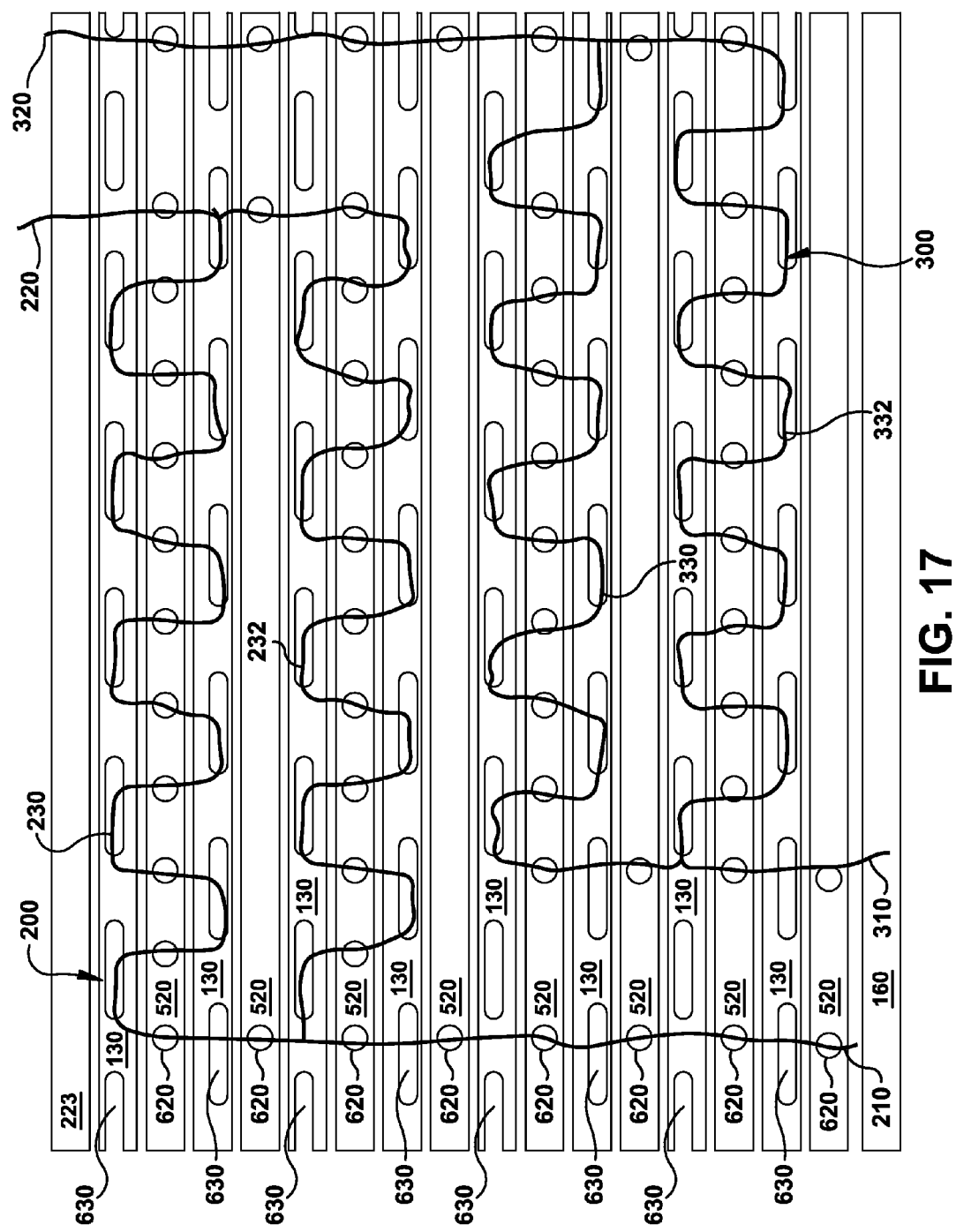
FIG. 17 depicts an exploded top view of the conductors disposed within slot 140 of FIG. 2, according to various embodiments of the disclosure.

FIG. 17 illustrates a cross sectional view of a pair of nested manifolds 200, 300 each having two axially extending passages 230, 232, 330, 332 disposed within eight conductors 130 within slot 140 (FIGS. 1-3). Layers of insulation 520 may be disposed between each winding 130, as is known in the art. In FIGS. 17-19, each winding 130 is depicted turned on its side, showing the location and other details of various features described herein. Manifolds 200, 300 may be formed by providing holes in each of the conductors as further discussed with respect to FIGS. 17-21.

As shown in FIG. 17, each ingress passage 210, 310 and each egress passage 220, 320 may be made of a series of substantially axially aligned holes 620, 630 punched in insulation 520 and conductors 130 respectively. Holes 620 in insulation 520 may be substantially round, and may be located such that they are substantially centered at a midplane of slot 140 (FIGS. 1-3). In contrast, holes 630 in conductors 130 may be substantially elongated in shape. Relative to an axial position of holes 620 in insulation 520, elongated holes 630 in conductors 130 extend in alternating axial directions from the axial position of holes 620 in the insulation 520. Regardless of the axial direction in which each elongated hole 630 extends, each elongated hole 630 axially overlaps with adjacent holes 620 in insulation 520, and with a portion of the elongated hole 630 in the next conductor 130. This creates a radially extending channel through which cooling gas can flow, and forms, for example, first ingress passage 210 and first egress passage 220 in manifold 200, and analogous ingress and egress passages in subsequent manifolds.

As further shown in FIGS. 17-18, axially extending passages 230, 232, 330, 332 may be serpentine in shape. Serpentine axially extending passages 230, 232, 330, 332 are made up of elongated holes 630 in adjacent stacked conductors 130. Because of the alternating relationship described above with respect to holes 630 in adjacent conductors 130, elongated holes 630 in adjacent stacked conductors 130 are axially staggered such that the elongated holes 630 in adjacent stacked conductors 130 axially overlap at each end. Elongated holes 630 in adjacent stacked conductors 130 are fluidly connected to one another despite radial separation by hole 620 in the interposed insulation 520. Hole 620 is aligned with the axial overlap of the elongated holes 630. This causes cooling gas to follow a serpentine path through more than one conductor 130 as depicted in FIGS. 17-18. As described above with respect to other embodiments, one or more serpentine axially extending passages 230, 232, e.g., can be fed by the same ingress passage 210, and can feed the same egress passage 220.

Holes 630 in conductors 130 may be provided in a continuous pattern along an axial length of conductor 130, i.e., holes 630 may be provided at a repeating axial interval along the length of conductor 130. In contrast, holes 620 in insulation 520 may be provided in a discontinuous pattern. As a result, with reference to FIG. 17, cooling gas may enter ingress passage 210, and proceed radially outward with respect to the rotor until it reaches axially extending passage 230 and/or 232. The gas flow then turns in an axial direction, flows axially along elongated hole 630 until it can flow no further. The flow path then turns radially inward, passes through hole 620 in insulation 520, and into a downstream elongated hole 630 in an adjacent and radially inward conductor 130. Because holes 620 are not provided at a continuous, regular interval in insulation 520, the cooling gas is blocked by insulation 520 from continuing to flow radially inwardly beyond elongated hole 630, and must turn axially again. This pattern repeats until the axially extending passage 230 reaches egress passage 220.

As the flow path winds through elongated holes 630 in conductors 130 and holes 620 in insulation 520, a single axially extending passage 230 may cool two or more conductors 130. It is noted that although these features are described with respect to axially extending passage 230, they are equally applicable to all other axially extending passages in various embodiments.

Figure 20:
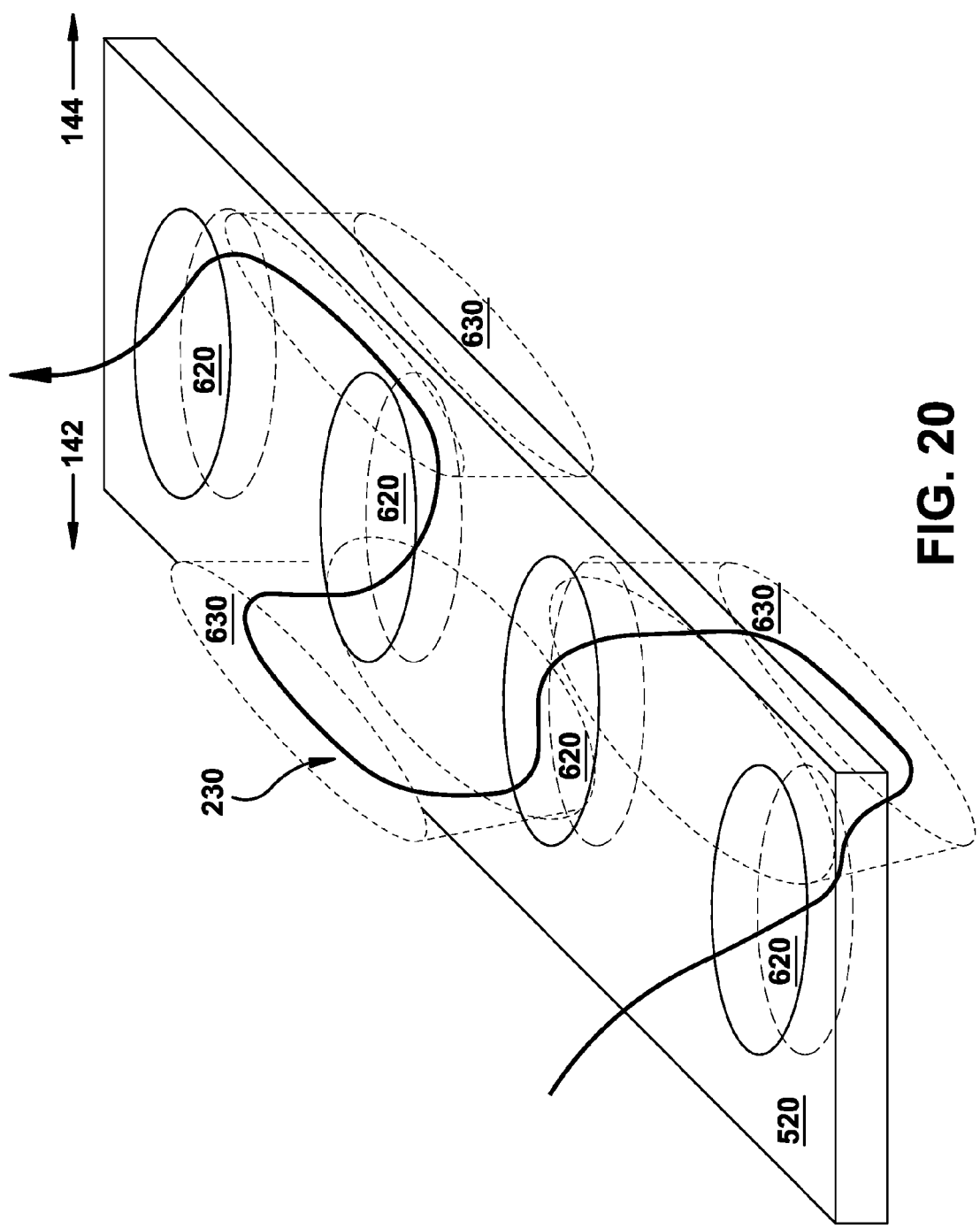
FIG. 20 depicts a perspective view of a portion of the insulation disposed between two conductors of FIGS. 17-19, according to embodiments of the disclosure.

In some embodiments, as shown in FIGS. 19-20, elongated holes 630 in adjacent stacked conductors 130 are positioned such that in alternating conductors 130, elongated holes 630 are alternately positioned at a leading edge 142 and a trailing edge 144 of slot 140 (FIG. 3), respectively. Ingress passage 210, egress passage 220, and axially extending passages 230, 232, etc. are provided as described above with respect to FIG. 17, however the addition of the staggering between the leading 142 and trailing edge 144 provides a helical fluid flow path through conductors 130 as shown in FIG. 20.

With reference to FIG. 21, each elongated hole 630 in conductor 130 may further include a breakout opening 632 for directing the flow of cooling gas downstream from an elongated hole 630 to a next, downstream elongated hole 630 in the serpentine passage. Breakout opening 632 may be substantially funnel shaped.

In further embodiments, each of the plurality of axially extending passages 230, 232, etc. has a cross sectional area which may vary according to the radial depth of the particular axially extending passage. For example, in one embodiment, the cross sectional area of the axially extending passage 230 (FIG. 17), which is disposed at a smallest radial depth relative to the exterior surface 102 of the rotor 100 (FIG. 3), i.e., is nearest the exterior surface 102 of the rotor 100, may be greater than, e.g., the cross sectional area of axially extending passage 232. Axially extending passage 232 may be located at a greater radial depth relative to the exterior surface 102 of the rotor 100, i.e., is located nearer to subslot 160 (FIG. 3), and may have a smaller cross sectional area.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotor comprising:
a plurality of axially extending slots disposed about a body of the rotor;
a plurality of conductors radially stacked within each of the axially extending slots;
an axially extending subslot disposed at a radially inward end of each of the axially extending slots;
in each slot, a cooling path extending radially outward from the subslot, the cooling path comprising a first manifold and a second manifold, wherein each of the first and the second manifolds includes:
an ingress passage extending outwardly in a substantially radial direction from the sub slot at a first axial position along the slot, wherein the ingress passage extends to a partial radial depth of the slot,
an egress passage extending outwardly in a substantially radial direction from a partial radial depth of the slot to the radially outer surface of the rotor, the egress passage being disposed at a second axial position along the slot, axially distanced from the first axial position, and
a plurality of axially extending passages in fluid connection at a first end with the ingress passage, and at a second end with the egress passage, wherein each of the plurality of axially extending passages is disposed at a different radial depth in the slot from each other axially extending passage, and
wherein the first and the second manifolds are configured to form a nest of manifolds in which the plurality of axially extending passages of the first manifold are substantially parallel to, at a different radial depth from, and at least partially axially overlapping with the plurality of axially extending passages of the second manifold.

2. The rotor of claim 1, wherein in each of the first and the second manifolds, the ingress passage and the egress passage are substantially parallel to one another, and extend radially outwardly at an angle that is not perpendicular to the subslot.

3. The rotor of claim 1, wherein each of the plurality of axially extending passages in each of the first and second manifolds have substantially the same axial length.

4. The rotor of claim 1, wherein each axially extending passage has an independently selected cross sectional area.

5. The rotor of claim 1, wherein each of the plurality of axially extending passages in the first manifold are in fluid connection with the ingress passage in the first manifold.

6. The rotor of claim 1, wherein each of the plurality of axially extending passages in the first manifold are in fluid connection with the egress passage in the first manifold.

7. The rotor of claim 1, further comprising insulation disposed between each of the conductors in the plurality of conductors,
wherein each of the ingress passage and the egress passage comprise holes punched in the conductors and the insulation disposed between the conductors, and
the holes in the insulation are substantially round and substantially centered at a mid-plane of each slot.

8. The rotor of claim 7, wherein the holes in the conductors are elongated, and wherein, relative to an axial position of the holes in the insulation, the elongated holes in the conductors extend in alternating axial directions from the axial position of the holes in the insulation.

9. The rotor of claim 8, wherein each of the axially extending passages further comprise a serpentine passage including elongated holes in adjacent stacked conductors, wherein the elongated holes in adjacent stacked conductors are axially staggered such that the elongated holes in adjacent stacked conductors axially overlap at each end,
wherein the elongated holes in adjacent stacked conductors are fluidly connected to one another by a hole in the interposed insulation that is aligned with the axial overlap of the elongated holes.

10. The rotor of claim 9, wherein the elongated holes in adjacent stacked conductors are positioned such that in alternating conductors, the elongated holes are positioned at a leading edge and a trailing edge of the slot, respectively, such that the serpentine passageway provides a helical fluid flow path.

11. The rotor of claim 9, wherein each of the plurality of axially extending passages has a cross sectional area, and wherein the cross sectional area of the axially extending passage at a smallest radial depth relative to the exterior surface of the rotor is greater than the cross sectional area of the axially extending passage at a greater radial depth relative to the exterior surface of the rotor.

12. The rotor of claim 9, wherein each elongated hole incudes a breakout opening for directing flow into a downstream elongated hole in the serpentine passage.

13. The rotor of claim 1, wherein the second manifold is laterally displaced from, and axially aligned with, the first manifold, and the second manifold provides a fluid flow path in an axial direction that is opposite of a fluid flow path provided by the first manifold.

14. The rotor of claim 1, wherein the cooling path further comprises a third manifold, the third manifold being nested with the first and the second manifolds such that
an ingress passage of the third manifold is axially distanced from an ingress passage of the first and the second manifolds,
an egress passage of the third manifold is axially distanced from an egress passage of the first and the second manifolds, and
the plurality of axially extending passages of the third manifold are substantially parallel to, and at a different radial depth from, the plurality of axially extending passages of each of the first and the second manifolds.

15. A rotor comprising:
a plurality of axially extending slots disposed about a body of the rotor;
a plurality of conductors radially stacked within each of the axially extending slots;
an axially extending subslot disposed at a radially inward end of each of the axially extending slots; and
in each slot, a cooling path extending radially outward from the subslot through the plurality of conductors, the cooling path comprising a plurality of nests of manifolds, wherein each manifold in each nest of manifolds includes:
an ingress passage extending radially outwardly from the subslot at a first axial position along the slot, wherein the ingress passage extends to a partial radial depth of the slot,
an egress passage extending radially outwardly from a partial radial depth of the slot to the radially outer surface of the rotor, the egress passage being disposed at a second axial position along the slot, axially distanced from the first axial position, and
a plurality of axially extending passages in fluid connection at a first end with the ingress passage, and at a second end with the egress passage, wherein each of the plurality of axially extending passages is disposed at a different radial depth in the slot from each other axially extending passage, wherein within each nest of manifolds, the plurality of axially extending passages of a first manifold in the nest of manifolds are substantially parallel to, and at a different radial depth from, the plurality of axially extending passages of a second manifold.

16. The rotor of claim 15,
wherein the first nest of manifolds is laterally displaced from, and axially aligned with the second nest of manifolds, and the second nest of manifolds provides a fluid flow path in an axial direction that is opposite of a fluid flow path provided by the first manifold.

17. The rotor of claim 15, further comprising:
insulation disposed between each of the conductors,
wherein each of the ingress passages and each of the egress passages comprise:
substantially round holes punched in the insulation, and
elongated holes punched in the conductors, wherein, relative to an axial position of the substantially round holes in the insulation, the elongated holes in the conductors extend in alternating axial directions from the axial position of the holes in the insulation.

18. A rotor comprising:
a plurality of axially extending slots disposed about a body of the rotor;
a plurality of conductors radially stacked within each of the axial slots;
insulation disposed between each of the conductors; and
an axially extending subslot disposed at a radially inward end of each of the axially extending slots;
in each slot, a cooling path extending radially outward from the subslot, the cooling path comprising at least one manifold,
wherein each manifold includes:
at least one ingress passage extending outwardly in a substantially radial direction from the subslot at a first axial position along the slot, wherein the at least one ingress passage extends to a partial radial depth of the slot and comprises holes punched in the conductors and the insulation disposed between the conductors,
at least one egress passage extending outwardly in a substantially radial direction from a partial radial depth of the slot to the radially outer surface of the rotor, the at least one egress passage being disposed at a second axial position along the slot, axially distanced from the first axial position, and comprising holes punched in the conductors and the insulation disposed between the conductors, and
a plurality of axially extending passages in fluid connection at a first end with one of the at least one ingress passages, and at a second end with one of the at least one egress passages, wherein each of the plurality of axially extending passages is disposed at a different radial depth in the slot from each other axially extending passage, wherein the holes in the insulation are substantially round and substantially centered at a mid-plane of the slot, and the holes in the conductors are elongated, and relative to an axial position of the holes in the insulation, the elongated holes in the conductors extend in alternating axial directions from the axial position of the holes in the insulation, wherein each of the axially extending passages further comprise a serpentine passage including elongated holes in adjacent stacked conductors, wherein the elongated holes in adjacent stacked conductors are axially staggered such that the elongated holes in adjacent stacked conductors axially overlap at each end, and wherein the elongated holes in adjacent stacked conductors are fluidly connected to one another by a hole in the interposed insulation that is aligned with the axial overlap of the elongated holes.

19. The rotor of claim 18, wherein the elongated holes in adjacent stacked conductors are positioned such that in alternating conductors, the elongated holes are positioned at a leading edge and a trailing edge of the slot, respectively, such that the serpentine passageway provides a helical fluid flow path.

20. The rotor of claim 19, wherein each of the plurality of axially extending passages has a cross sectional area, and wherein the cross sectional area of the axially extending passage at a smallest radial depth relative to the exterior surface of the rotor is greater than the cross sectional area of the axially extending passage at a greater radial depth relative to the exterior surface of the rotor, and wherein each elongated hole incudes a breakout opening for directing flow into a downstream elongated hole in the serpentine passage.

* * * * *